(12) United States Patent
Esparza

(10) Patent No.: US 9,139,122 B2
(45) Date of Patent: Sep. 22, 2015

(54) WHEELCHAIR TRANSPORTATION LOADING AND STORAGE APPARATUS

(76) Inventor: Miguel Esparza, Georgetown, TX (US)

( * ) Notice: Subject to any disclaimer, the term of this patent is extended or adjusted under 35 U.S.C. 154(b) by 97 days.

(21) Appl. No.: 13/311,177

(22) Filed: Dec. 5, 2011

(65) Prior Publication Data

US 2013/0142604 A1    Jun. 6, 2013

(51) Int. Cl.
*B65F 1/00* (2006.01)
*B60P 1/54* (2006.01)

(52) U.S. Cl.
CPC ............. *B60P 1/5433* (2013.01); *B60P 1/5495* (2013.01)

(58) Field of Classification Search
CPC ......................................................... B60P 3/00
USPC .......... 414/462, 486, 541, 543, 549, 550, 921
See application file for complete search history.

(56) References Cited

U.S. PATENT DOCUMENTS

| | | | |
|---|---|---|---|
| 4,010,859 A | 3/1977 | Ronian et al. | |
| 4,015,725 A | 4/1977 | Ryan et al. | |
| 4,134,509 A | 1/1979 | Clement | |
| 4,325,668 A | 4/1982 | Julian et al. | |
| 4,616,972 A | 10/1986 | McFarland | |
| 4,738,581 A | 4/1988 | Kuhlman | |
| 4,991,810 A | 2/1991 | Andrus et al. | |
| 5,165,839 A | 11/1992 | Aoki | |
| 5,234,311 A | 8/1993 | Loduha, Jr. et al. | |
| 5,261,779 A | 11/1993 | Goodrich | |
| 5,433,580 A | 7/1995 | Kempf | |
| 5,482,424 A | 1/1996 | Jones et al. | |
| 5,564,884 A * | 10/1996 | Farsai ........................... | 414/540 |
| 5,810,547 A | 9/1998 | Bruno et al. | |
| 6,007,289 A | 12/1999 | Kruse et al. | |
| 6,036,012 A | 3/2000 | Haseltine et al. | |
| 6,065,924 A | 5/2000 | Budd et al. | |
| 6,071,064 A | 6/2000 | Hackett | |
| 6,179,546 B1 | 1/2001 | Citrowske | |
| 6,309,170 B1 | 10/2001 | Vartanian | |
| 6,685,403 B2 | 2/2004 | Constantin | |
| 6,830,423 B1 | 12/2004 | Williams et al. | |
| 7,070,059 B1 | 7/2006 | Flowers et al. | |
| 7,083,373 B1 | 8/2006 | Boudreau | |
| 7,404,505 B2 | 7/2008 | Walther | |
| 7,594,556 B1 | 9/2009 | Panzarella et al. | |
| 7,735,839 B1 | 6/2010 | Schlangen | |
| 7,785,058 B2 | 8/2010 | Ray | |
| 7,862,287 B2 | 1/2011 | Egan | |
| 2001/0055520 A1 | 12/2001 | Budd et al. | |

(Continued)

*Primary Examiner* — Saul Rodriguez
*Assistant Examiner* — Willie Berry, Jr.
(74) *Attorney, Agent, or Firm* — Sean Christian Connolly

(57) ABSTRACT

An apparatus for loading a wheelchair into a vehicle and automatically storing the wheelchair within an enclosure that protects the wheelchair and the mechanisms of the apparatus from exposure to weather during transportation is disclosed. The Wheelchair Transportation Loading and Storage Apparatus would primarily be used to automatically load into and store a wheelchair within an enclosure, which protects the wheelchair and the apparatus' mechanisms from exposure to weather during transportation, which is mounted in a portion of a pick-up truck bed as to allow for substantial use of the pickup bed for other purposes such as the transportation and storage of tools and materials, and which appears as an ordinary pick-up-truck-bed tool box when it is in the stowed position. The Wheelchair Transportation Loading and Storage Apparatus comprises a wheelchair hoist, a weather-resistant enclosure and a control module which may be operated remotely.

1 Claim, 27 Drawing Sheets

(56) References Cited

U.S. PATENT DOCUMENTS

| | | |
|---|---|---|
| 2004/0022614 A1 | 2/2004 | Anderson |
| 2004/0177441 A1 | 9/2004 | Ronne |
| 2008/0056872 A1 | 3/2008 | Darnell et al. |
| 2010/0032244 A1 | 2/2010 | Lynch et al. |
| 2010/0247277 A1 | 9/2010 | DiGiovanni et al. |
| 2011/0002764 A1 | 1/2011 | Darnell et al. |

* cited by examiner

WHEELCHAIR TRANSPORTATION LOADING AND STORAGE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of wheelchair transport and storage systems. More particularly, the preferred embodiments of the present invention relate generally to wheelchair transport and storage systems which load wheelchairs into vehicles. More particularly, the preferred embodiments of the present invention relate generally to wheelchair transport systems which load wheelchairs into vehicles and which protect the wheelchair from exposure to the elements while being transported. Furthermore, the preferred embodiments of the present invention relate generally to wheelchair transport systems which load wheelchairs into vehicles and which protect the wheelchair from exposure to the elements while being transported in the bed of a pick-up-truck-type vehicle. Additionally, the present invention relates generally to a method of loading and storing wheelchairs in vehicles and protecting the wheelchair from exposure to the elements while being transported.

2. Description of the Related Art

The broad concept of a wheelchair loading and storage apparatus is known. These inventions usually involve a ramp or a lift. Some are suited for a wide variety of transporting vehicle while some are specifically intended for certain types of vehicles. Many of the existing inventions require extensive modification of the transporting vehicle to accommodate the wheelchair and the loading apparatus. Several of the existing inventions in this field require that the loading and storage apparatus take over functioning portions of the transporting vehicle and inhibit the use of those portions of the vehicle.

It is also known to construct a wheelchair loading and storage apparatus that uses a hoist to lift a wheelchair into a transporting vehicle. However, many of these hoist-utilizing apparatuses either load a wheelchair into the passenger compartment of the transporting vehicle, thereby requiring extensive modification of the passenger compartment of the transporting vehicle, or store the hoist in a location in which the hoist and/or the wheelchair is exposed to the elements during transportation.

It is also known to construct a wheelchair loading and storage apparatus which stores a wheelchair in a weather-resistant enclosure. However, most of these existing inventions with weather-resistant enclosures use the existing weather-resistant enclosures of the transporting vehicle, such as the passenger compartment. In such instances, extensive modification of the transporting vehicle is required to accommodate the wheelchair and the loading apparatus. Other existing inventions with weather-resistant enclosures substantially inhibit the use of portions of the vehicle. For example, inventions exist which store a wheelchair and its loading apparatus in the bed of a pick-up and use a camper-style enclosure to protect the wheelchair and the apparatus from exposure to the elements; however, this invention substantially inhibits the use of the remaining portions of the pick-up-truck bed from uses other than those of a camper-enclosed bed, and items too large to fit within the camper may not be transported while transporting a wheelchair.

It is also known to construct a wheelchair loading and storage apparatus specifically for pick-up trucks. However, many of the existing inventions do not protect the wheelchair from the elements once the wheelchair is loaded into the pick-up truck bed. Additionally, existing wheelchair loading and storage apparatus for pick-up trucks do not protect the loading apparatus itself from exposure to weather in the bed of the pick-up truck. The existing wheelchair loading and storage apparatus for a pick-up trucks which do protect the wheelchair and the apparatus itself from exposure to the elements require extensive modification of the vehicle or substantially inhibit the use of the pick-up-truck bed for its ordinary uses.

SUMMARY OF THE INVENTION

The broad embodiments of the present invention relates to improvements of an apparatus for loading a wheelchair into a vehicle which automatically stores the wheelchair within an enclosure that protects the wheelchair and the mechanisms of the apparatus from exposure to weather during transportation. In particular, the Wheelchair Transportation Loading and Storage Apparatus would primarily be used to automatically load into and store a wheelchair within an enclosure which protects the wheelchair and the loading apparatus' mechanisms from weather and which is mounted in a portion of a pickup truck bed to allow for substantial use of the pickup bed for other purposes, such as the transportation and storage of tools and materials.

In the most preferred embodiments, the Wheelchair Transportation Loading and Storage Apparatus comprises a hoist and a weather-resistant enclosure. In more detail, the hoist comprises a mast, a lifting arm, and an extendable strap, and is capable of lifting a wheelchair from a position substantially near the passenger compartment, over the sidewall of the pickup truck bed and into the enclosure, allowing utilization of the Wheelchair Transportation Loading and Storage Apparatus by the driver of the pick-up-truck-type vehicle. The mast is cable of telescoping from a stowed position which fits within the enclosure to deployed position which extends above the sidewall of the pickup truck bed. The lifting arm is mounted on the mast and comprises a fore arm and an aft arm, which are connected by a hinge and actuated by a piston. The lifting arm is capable of transitioning from a folded position that fits within the enclosure to a deployed position that extends the end of lifting arm to a location substantially near the passenger compartment of the pickup truck, allowing utilization of the Wheelchair Transportation Loading and Storage Apparatus by the driver of the pick-up-truck-type vehicle. The extendable strap comprises a strap and a wench. The strap is connected to the wench and extends from the end of the lifting arm to connect to a wheelchair when it is in a location substantially near the passenger compartment of the pickup truck and below the end of the lifting arm in its deployed position. The wench uses the strap to lift the connected wheelchair to a position substantially near the end of the lift arm, so that the lift arm may swing the wheel chair over the sidewall of the pickup truck to a location above the enclosure where it is then lowered into the enclosure. The enclosure comprises a weather-resistant shell and a weather-resistant cover that may be remotely opened and closed. The enclosure provides sufficient interior space to store a wheelchair and the mechanisms and electronics of the apparatus. The cover is capable of closing the enclosure and sealing the interior to sufficiently resist its exposure to external weather conditions. The Wheelchair Transportation Loading and Storage Apparatus allows a wheelchair to be transported in poor weather conditions without exposing delicate parts of the wheelchair to elements which can cause corrosion and damage. Furthermore, the Wheelchair Transportation Loading and Storage Apparatus enables a wheelchair user, including the driver of the pick-up-truck-type vehicle, to transfer to the passenger compartment or driver's seat of a pickup truck and independently load and stow the wheelchair into a weather-resistant enclosure. The enclosure is small enough to permit the pickup bed to be used for its intended purpose, such as storing and transporting tools and/or materials. Additionally, when closed, the apparatus has the appearance of a standard pickup truck bed tool box, concealing the wheelchair loading and storage cap ability of the vehicle.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the preferred embodiments of an apparatus for loading a wheelchair into a vehicle which automatically stores the wheelchair within an enclosure that protects the wheelchair and the mechanisms of the apparatus from exposure to weather during transportation. These embodiments are not intended to limit the scope of the present invention.

Figure 1:
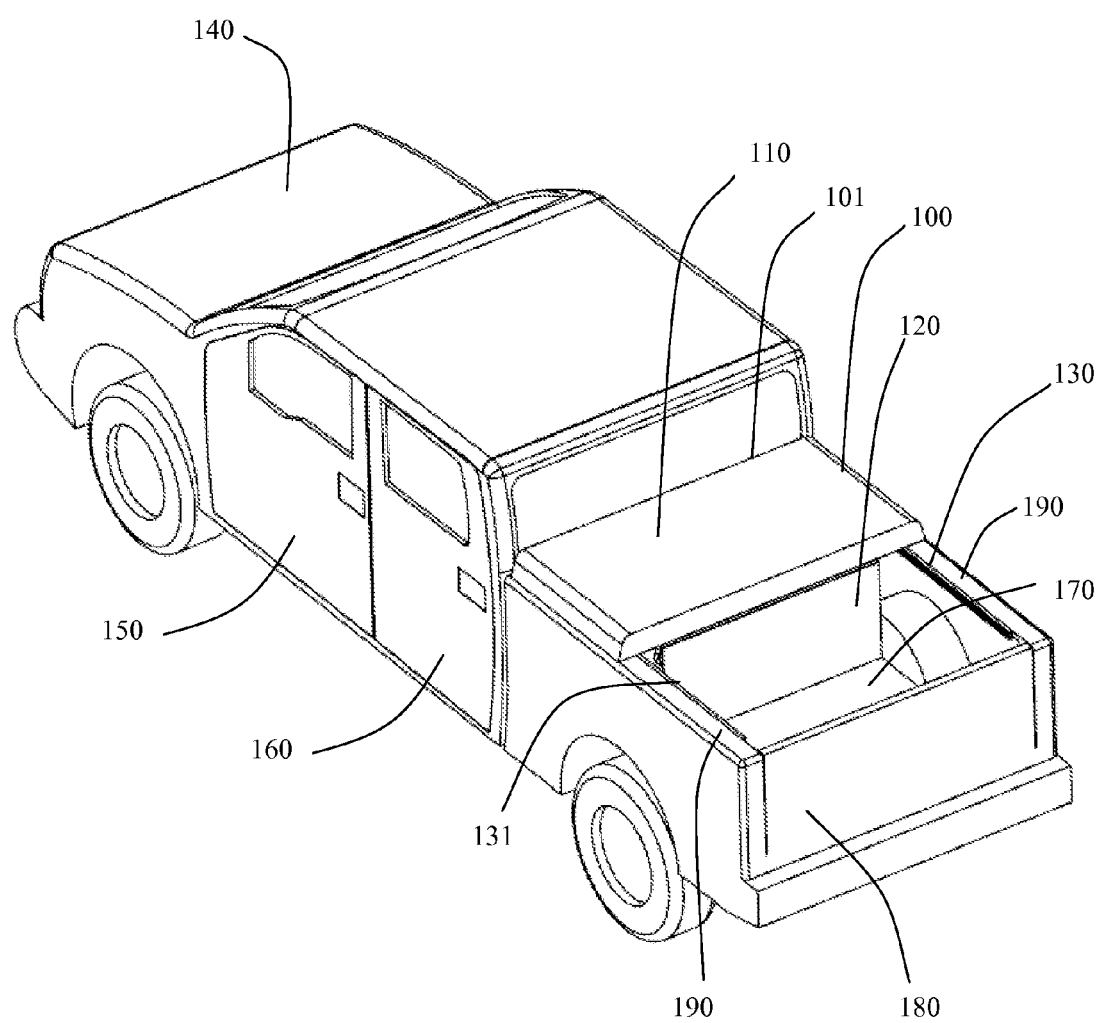
FIG. 1 is a perspective view of a pick-up-truck-type vehicle with an apparatus of the present invention in the stowed position.
Figure 2:
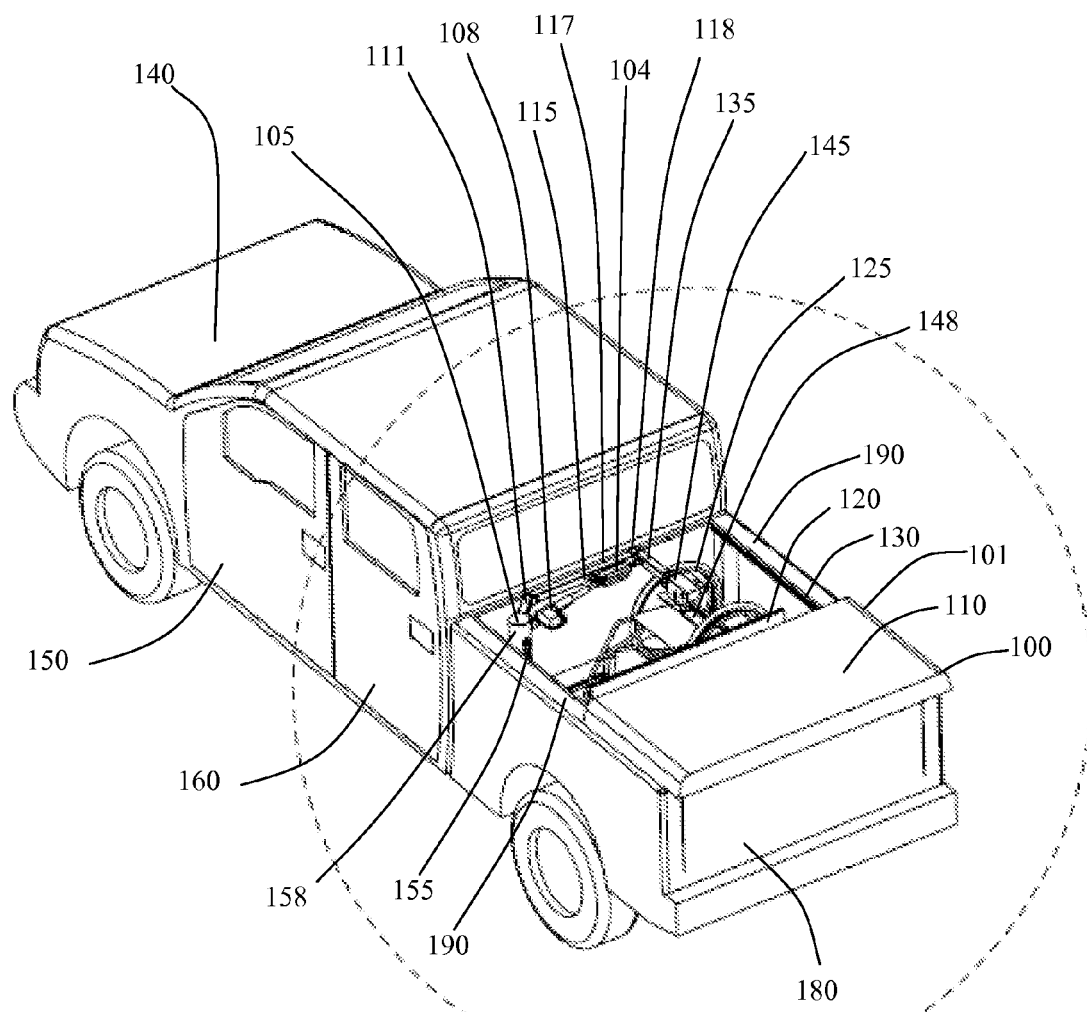
FIG. 2 is a perspective view of the pick-up-truck-type vehicle with the apparatus of the present invention of FIG. 1 in the process of loading/unloading a wheelchair.
Figure 3:
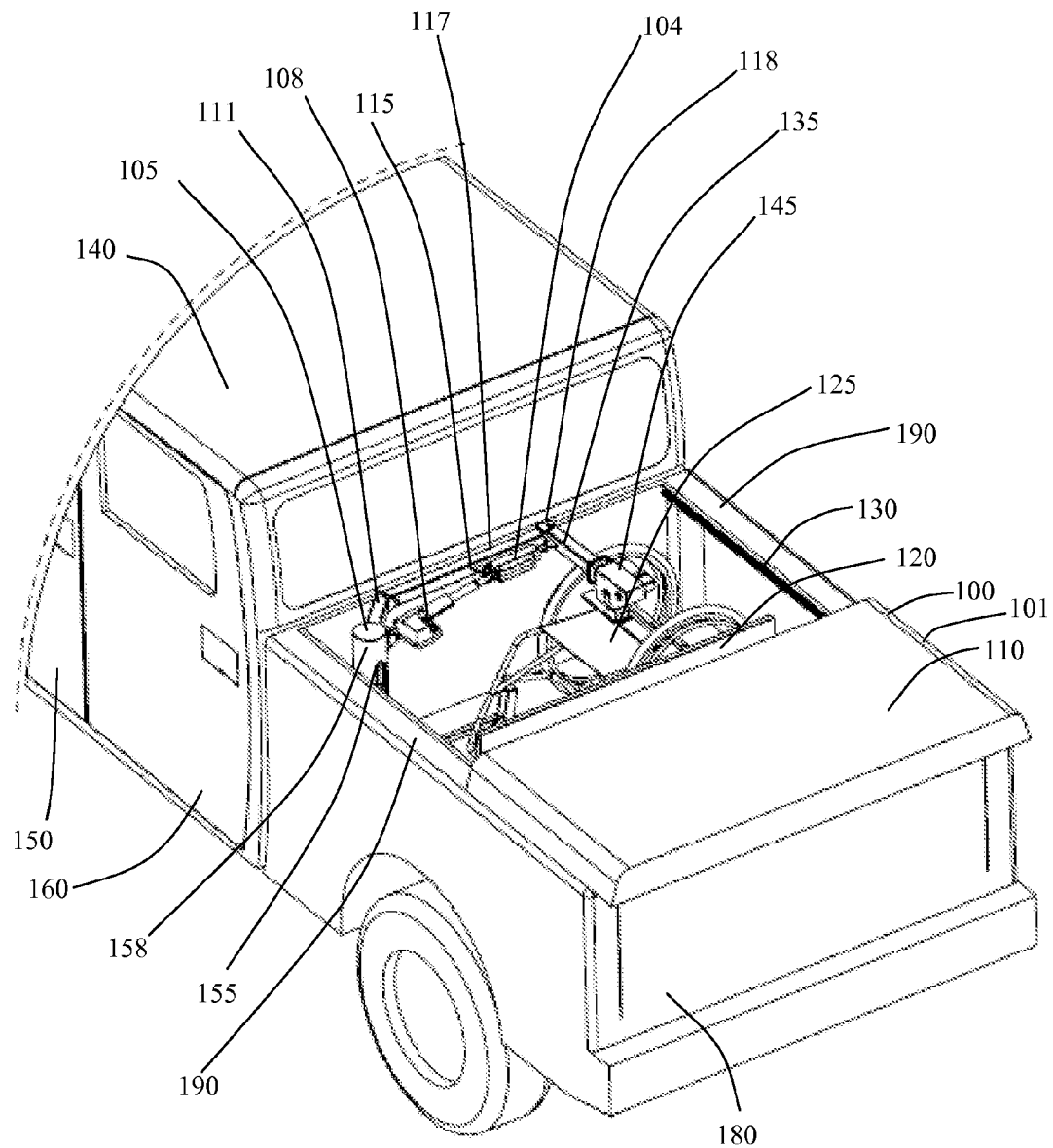
FIG. 3 is a perspective view of a close-up of the pick-up-truck-type vehicle with the apparatus of the present invention of FIG. 2.
Figure 4:
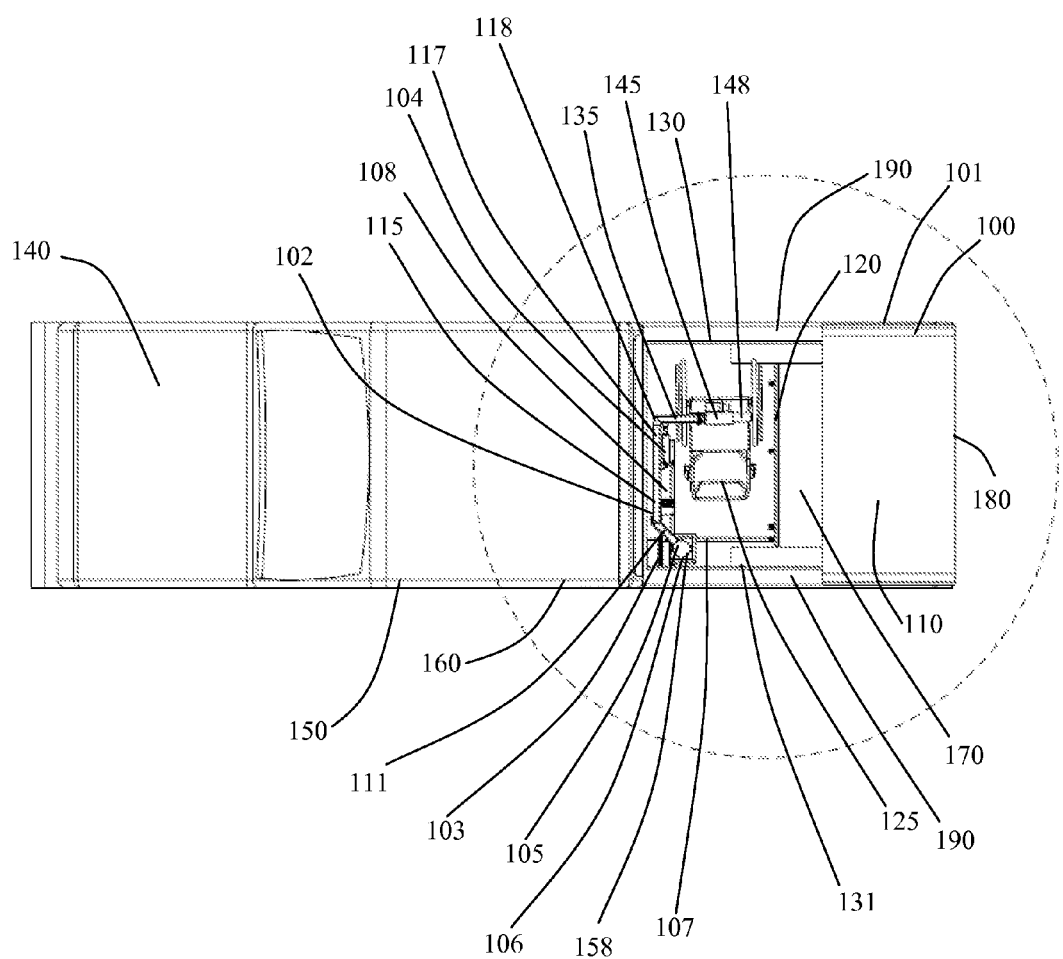
FIG. 4 is a top view of the pick-up-truck-type vehicle with the apparatus of the present invention of FIG. 2.
Figure 5:
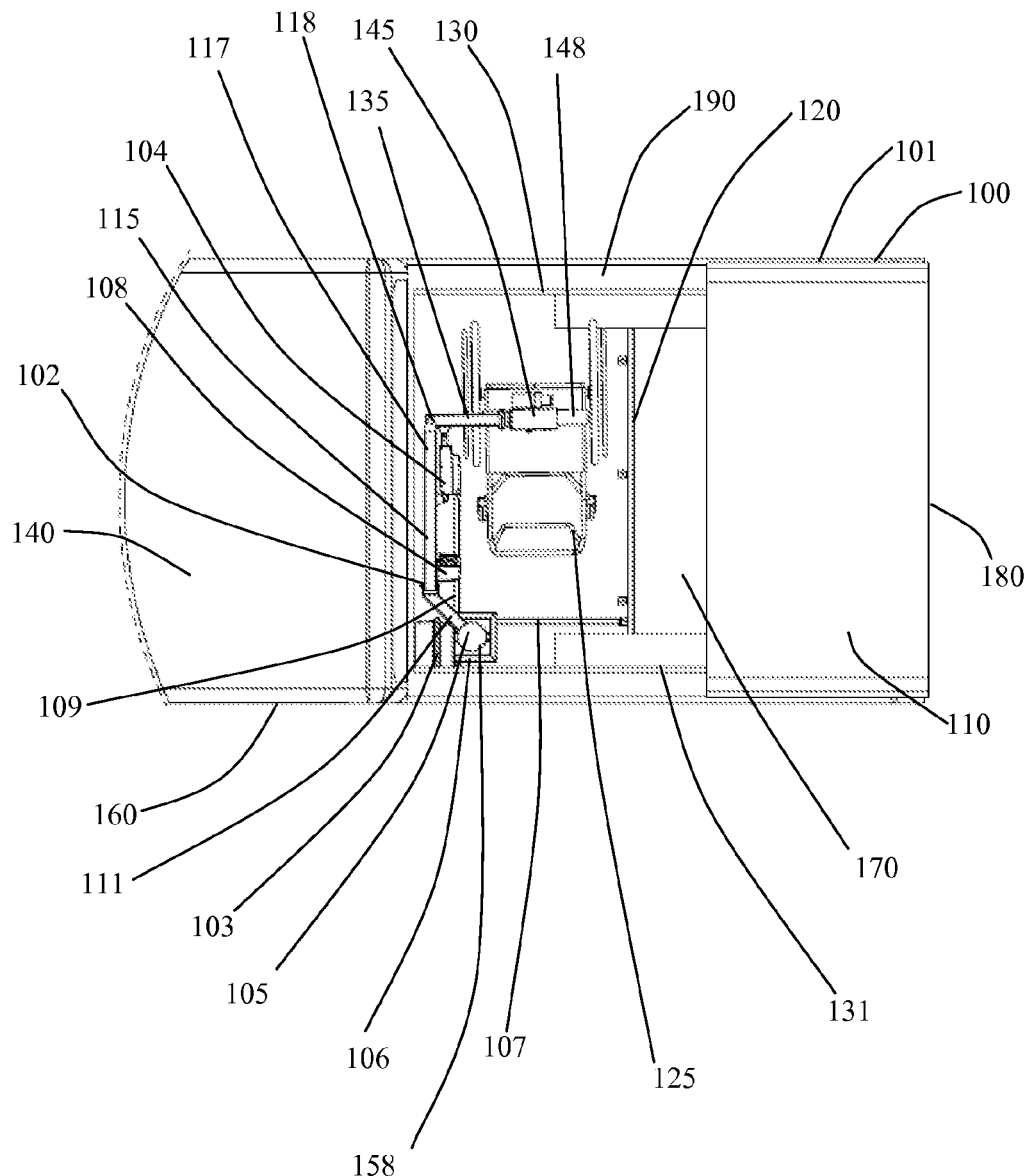
FIG. 5 is a top view of a close-up of the pick-up-truck-type vehicle with an apparatus of the present invention of FIG. 2.
Figure 6:
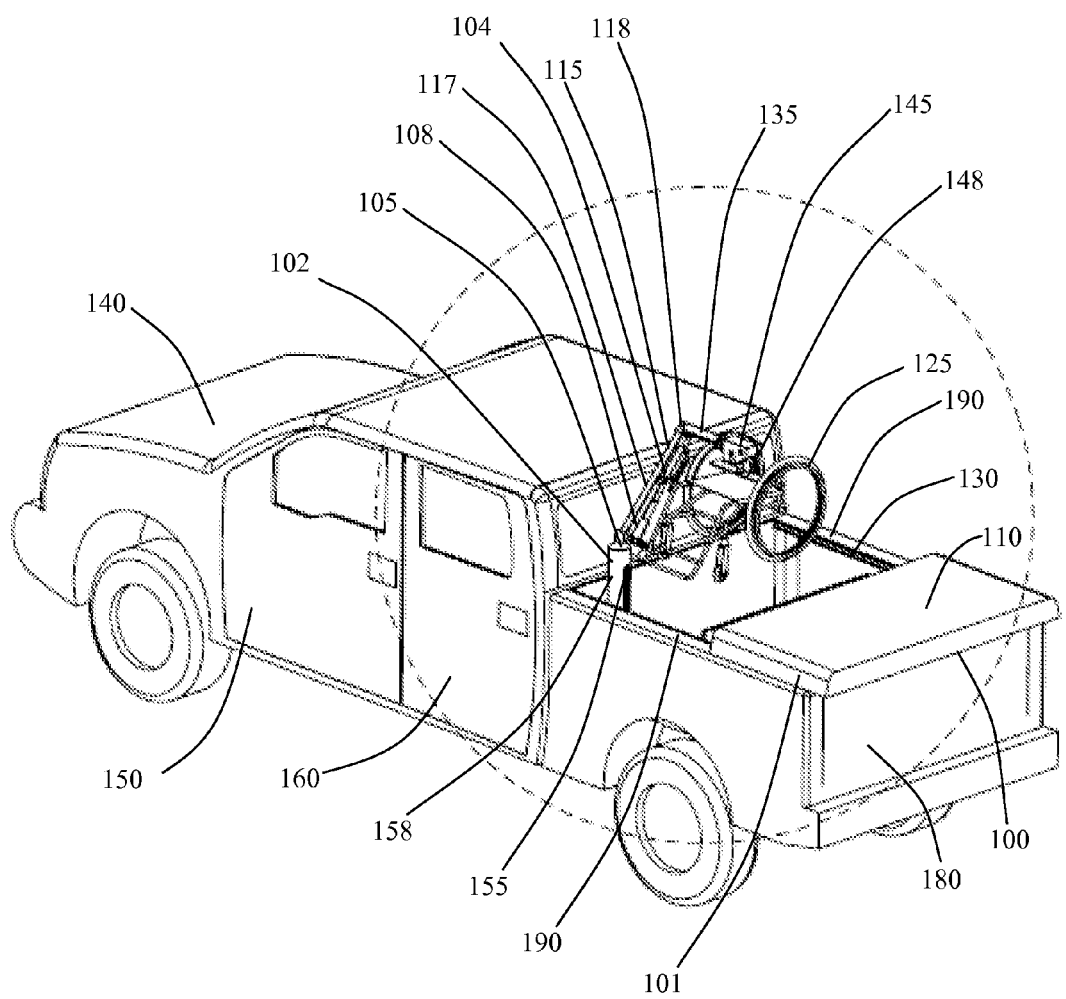
FIG. 6 is a perspective view of the pick-up-truck-type vehicle with the apparatus of the present invention of FIG. 1 in the process of loading/unloading a wheelchair.
Figure 7:
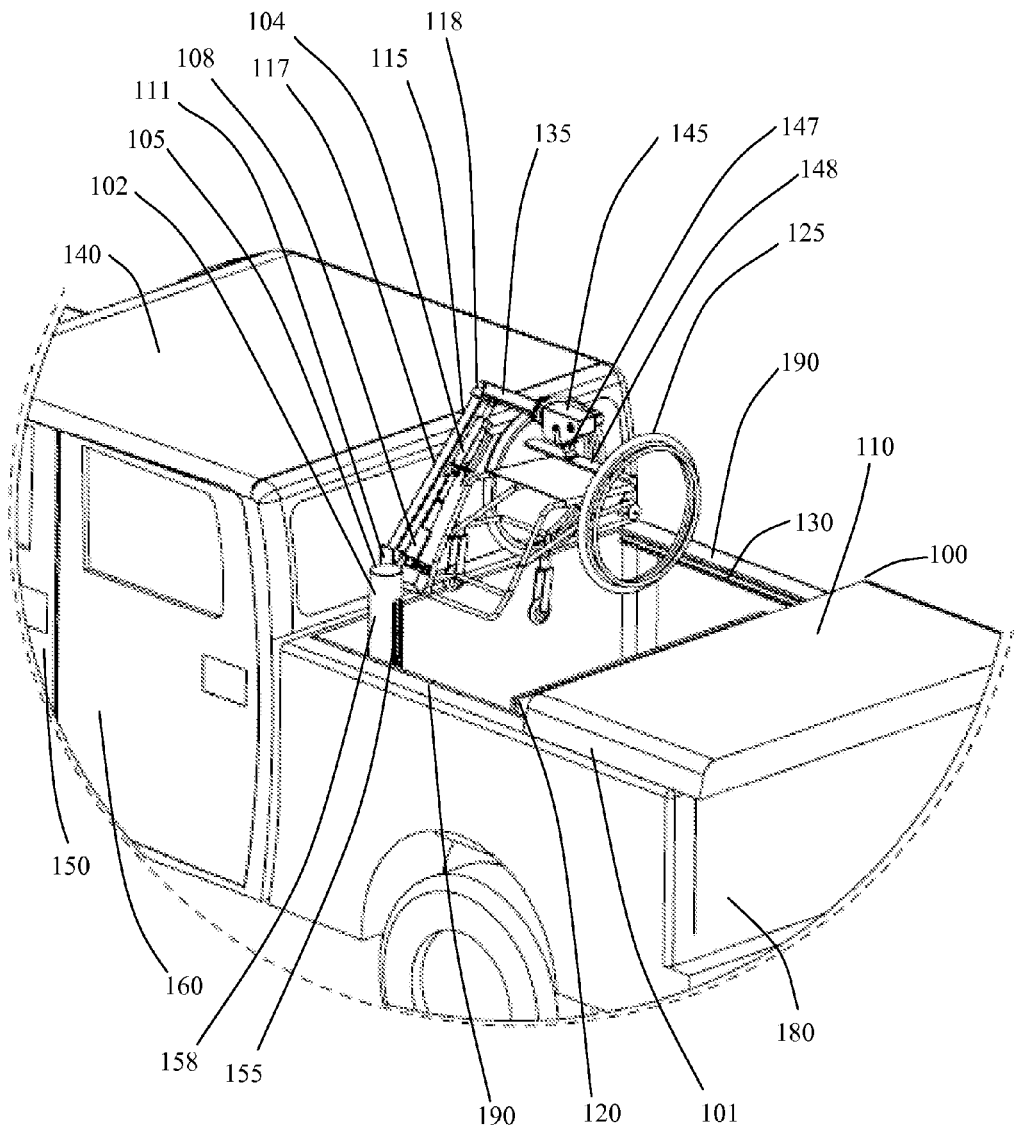
FIG. 7 is a perspective view of a close-up of the pick-up-truck-type vehicle with the apparatus of the present invention of FIG. 6.
Figure 8:
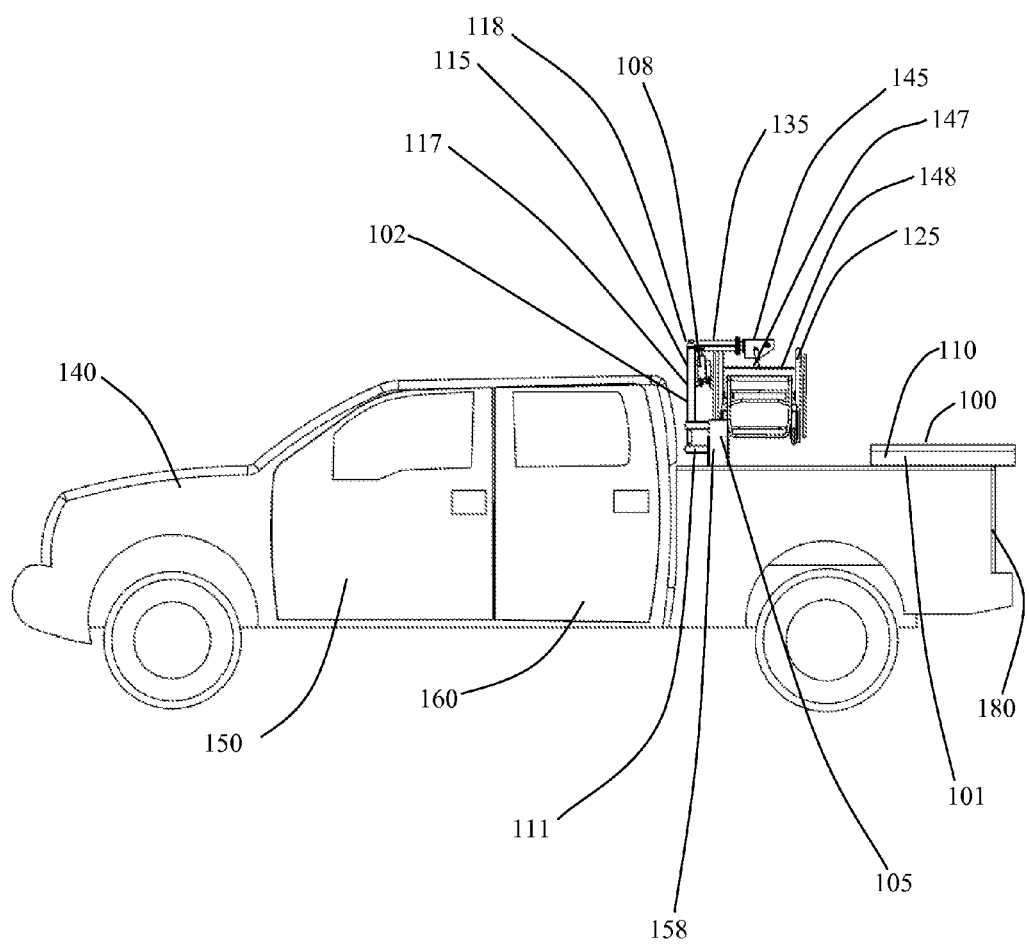
FIG. 8 is a side view of the pick-up-truck-type vehicle with the apparatus of the present invention of FIG. 6.
Figure 9:
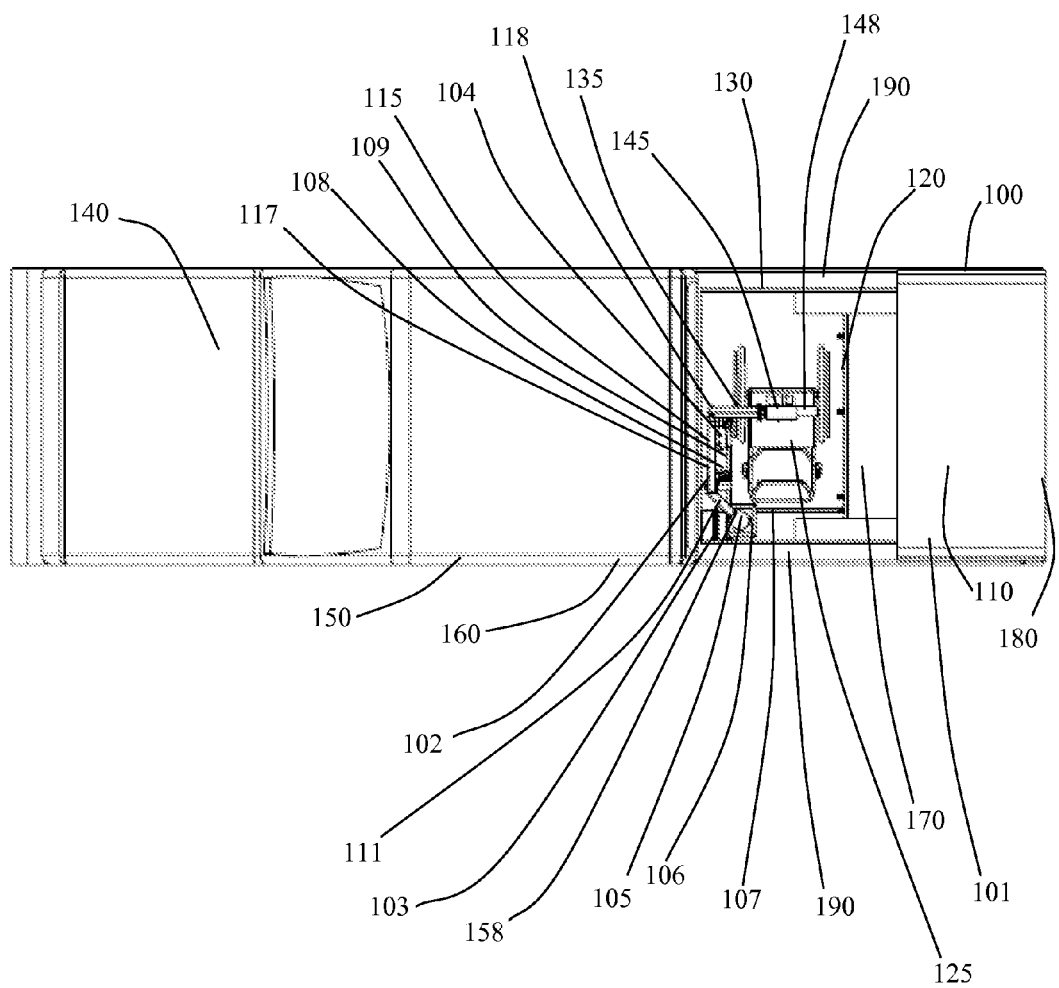
FIG. 9 is a top view of the pick-up-truck-type vehicle with the apparatus of the present invention of FIG. 6.
Figure 10:
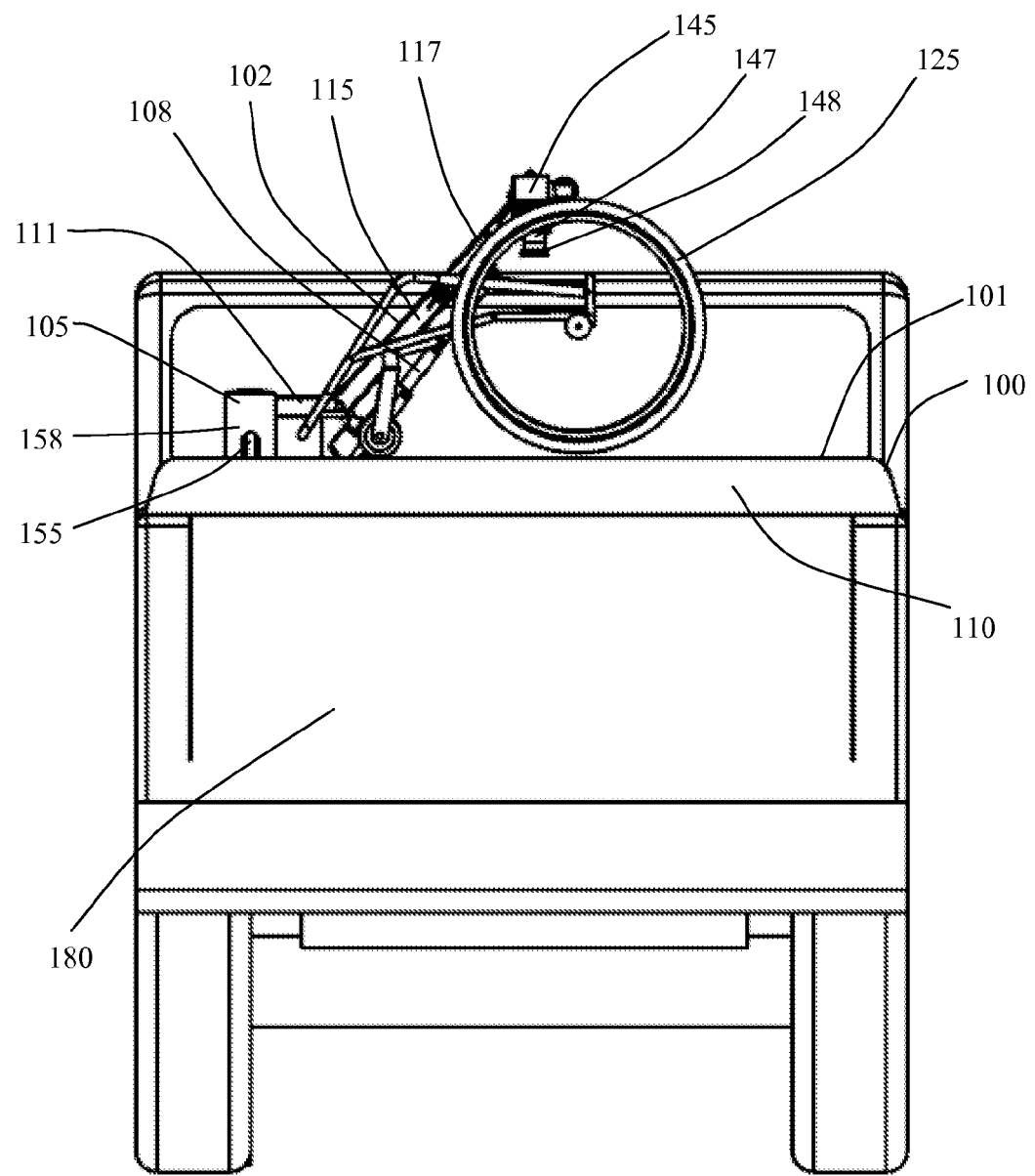
FIG. 10 is a rear view of the pick-up-truck-type vehicle with the apparatus of the present invention of FIG. 6.
Figure 11:
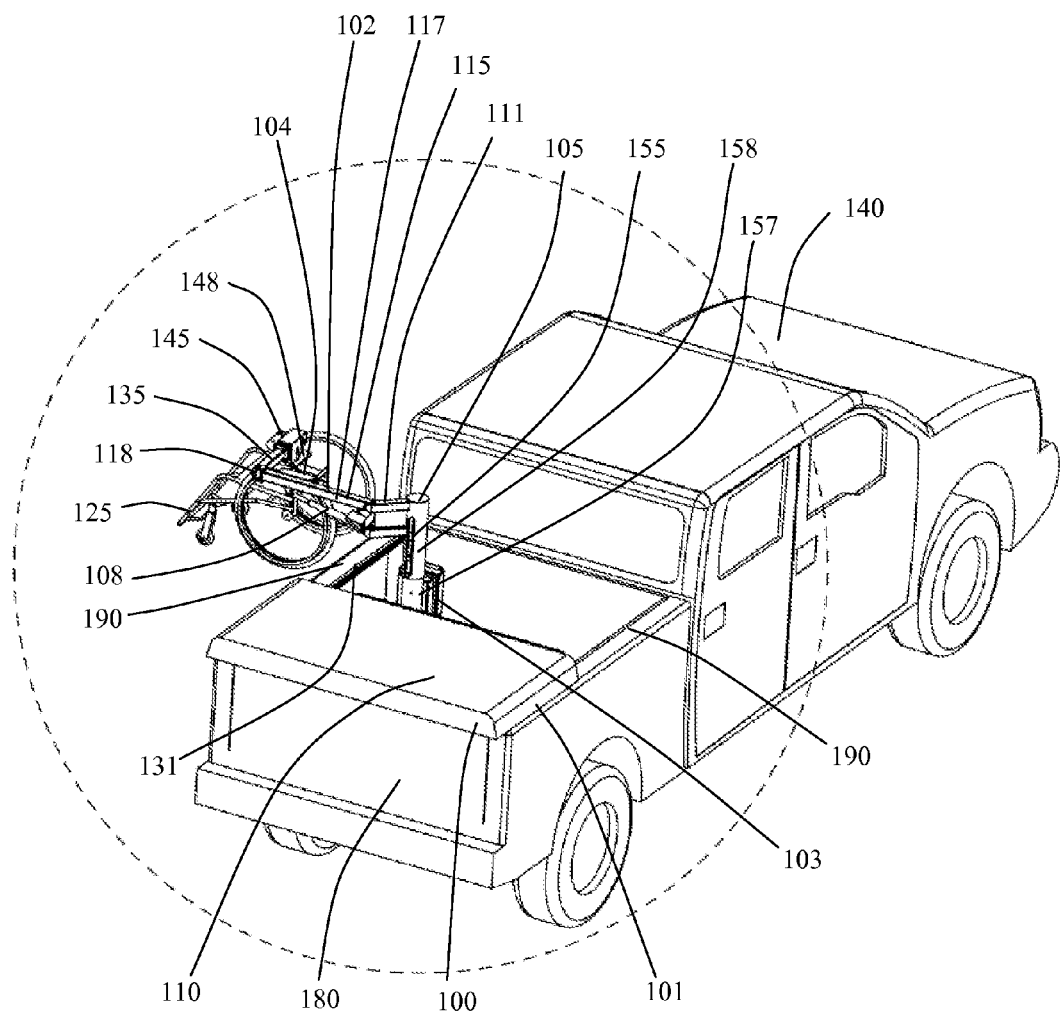
FIG. 11 is a rear perspective view of the pick-up-truck-type vehicle with the apparatus of the present invention of FIG. 1 in the process of loading/unloading a wheelchair.
Figure 12:
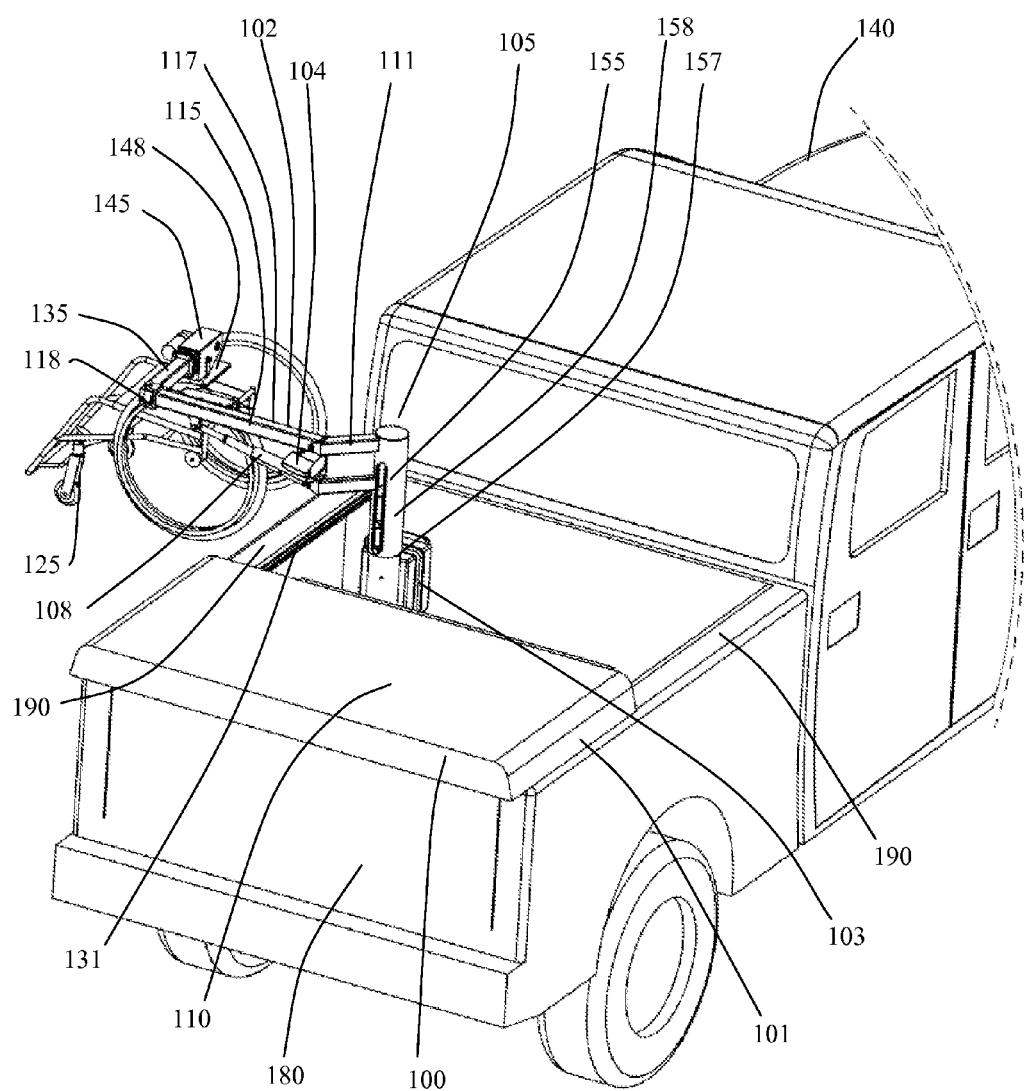
FIG. 12 is a rear perspective view of a close-up of the pick-up-truck-type vehicle with the apparatus of the present invention of FIG. 11 in the process of loading/unloading a wheelchair.
Figure 13:
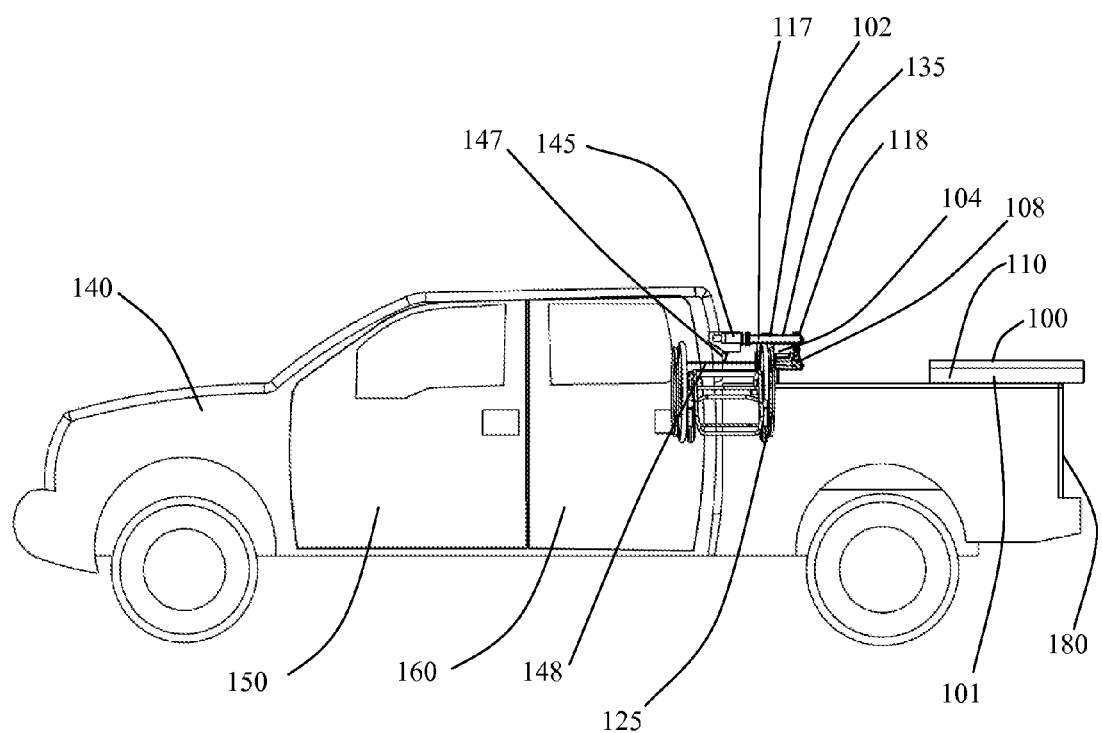
FIG. 13 is a side view of the pick-up-truck-type vehicle with the apparatus of the present invention of FIG. 11.
Figure 14:
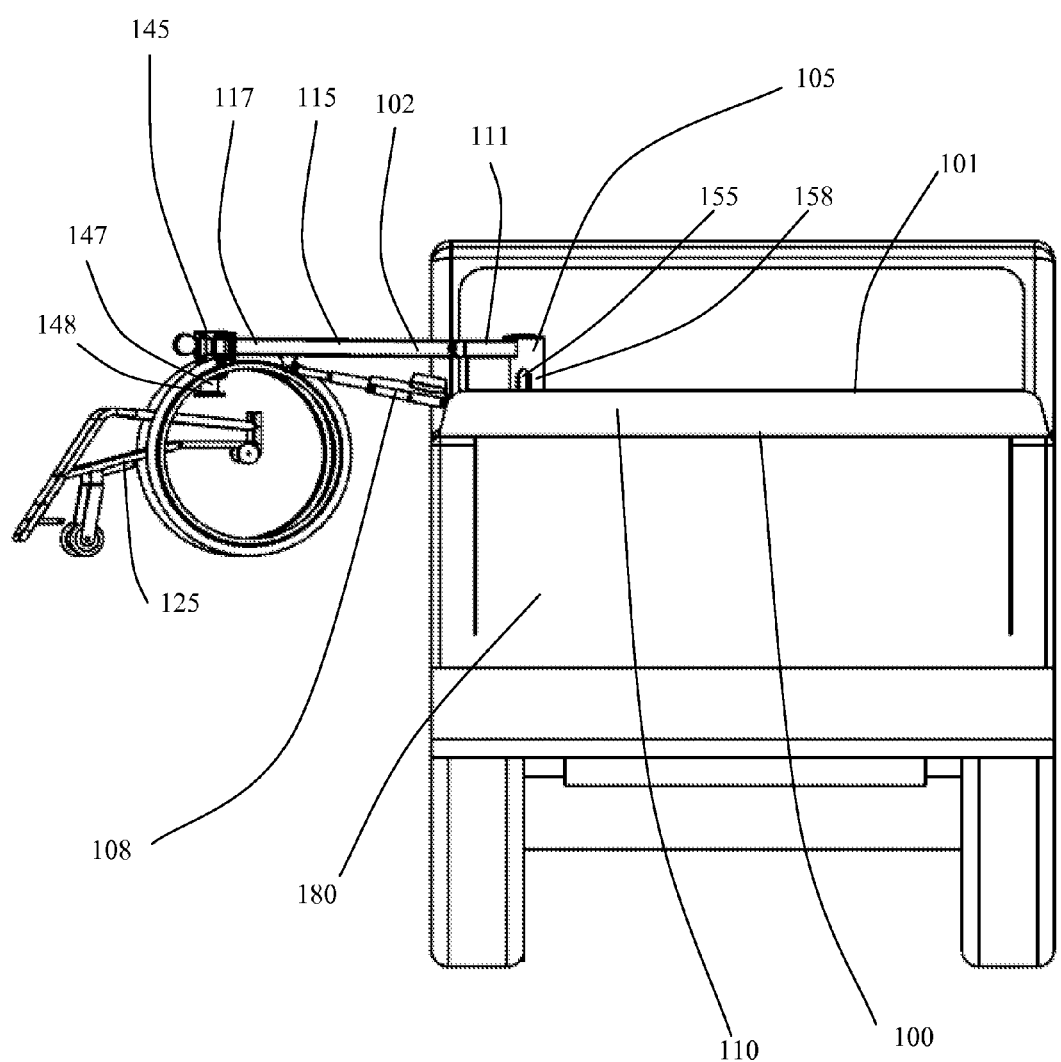
FIG. 14 is a rear view of the pick-up-truck-type vehicle with the apparatus of the present invention of FIG. 11.
Figure 15:
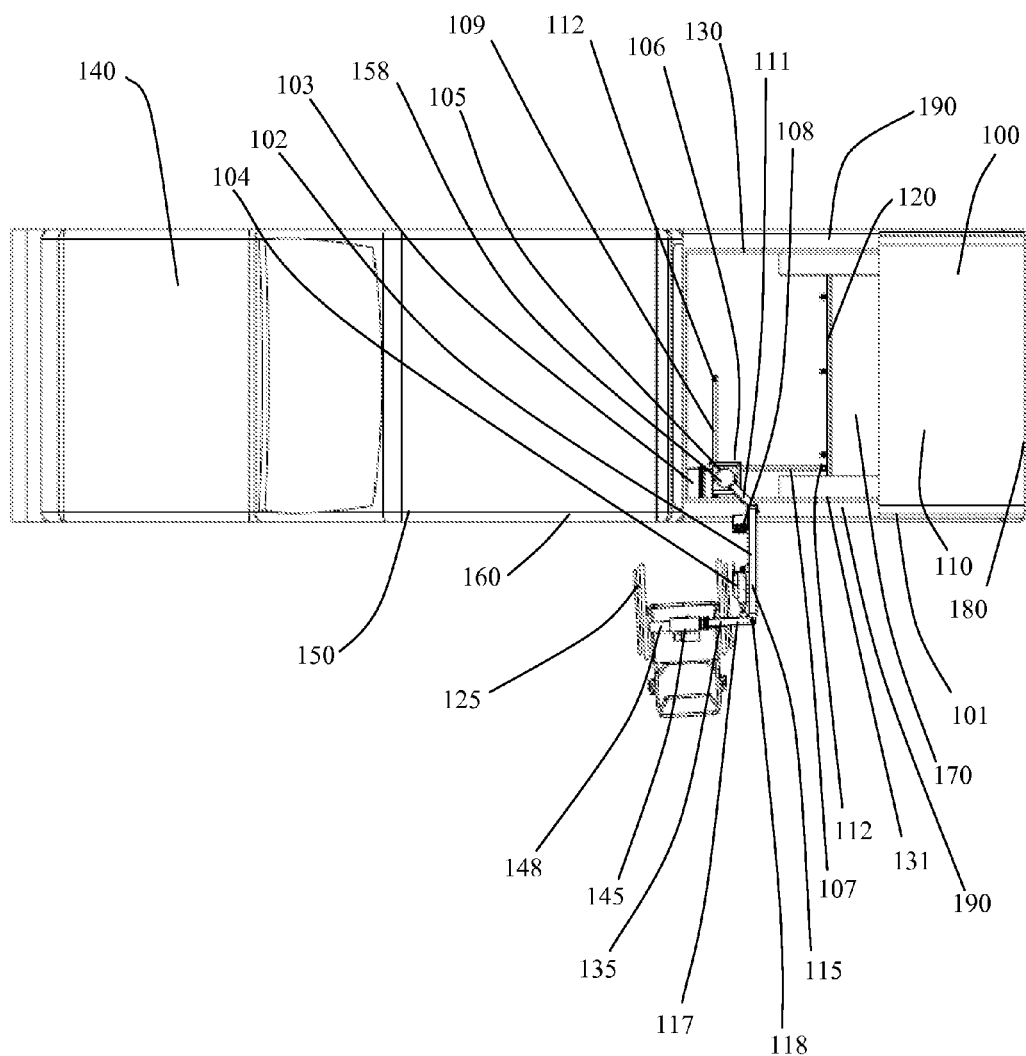
FIG. 15 is a top view of the pick-up-truck-type vehicle with the apparatus of the present invention of FIG. 11.
Figure 16:
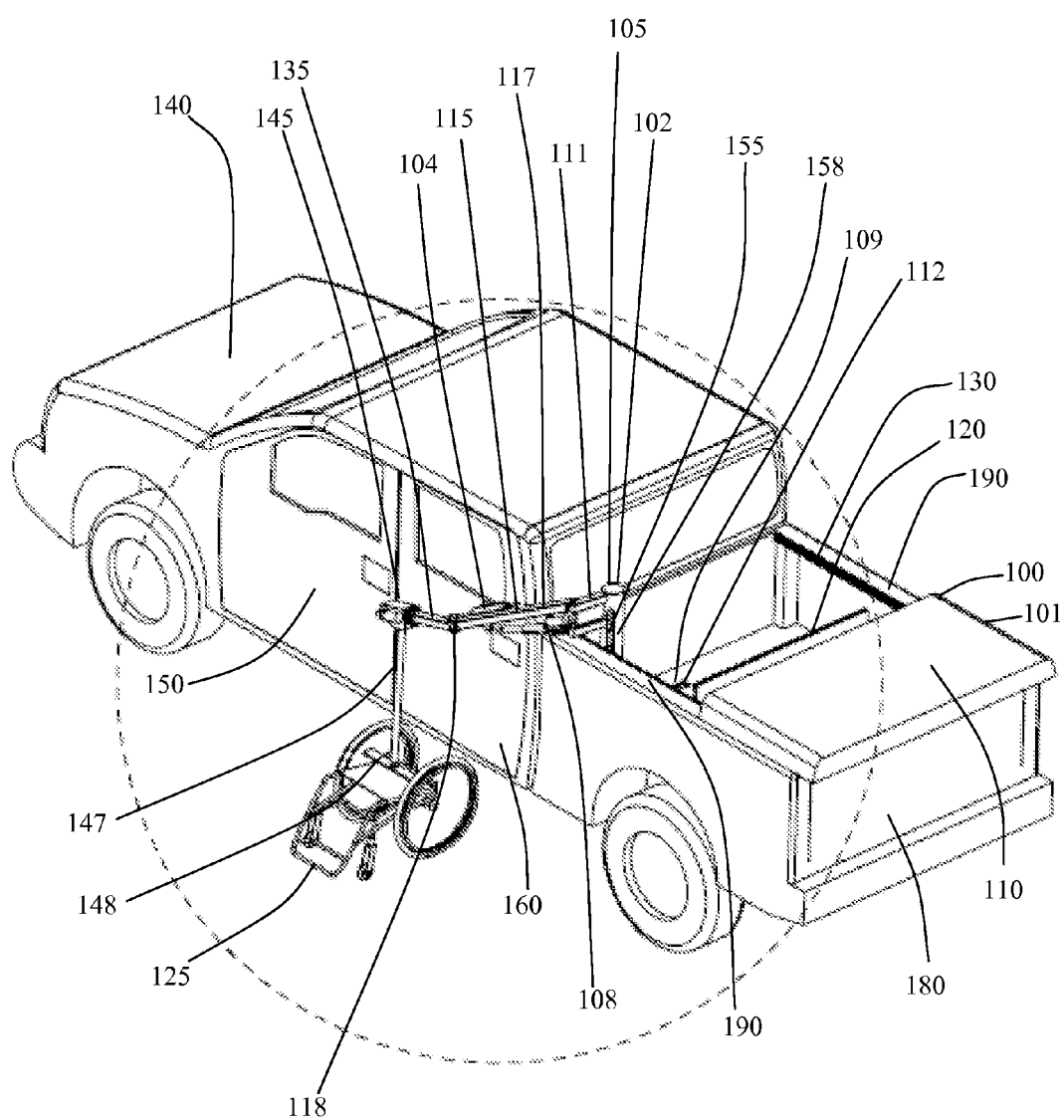
FIG. 16 is a perspective view of the pick-up-truck-type vehicle with the apparatus of the present invention of FIG. 1 in the process of loading/unloading a wheelchair.
Figure 17:
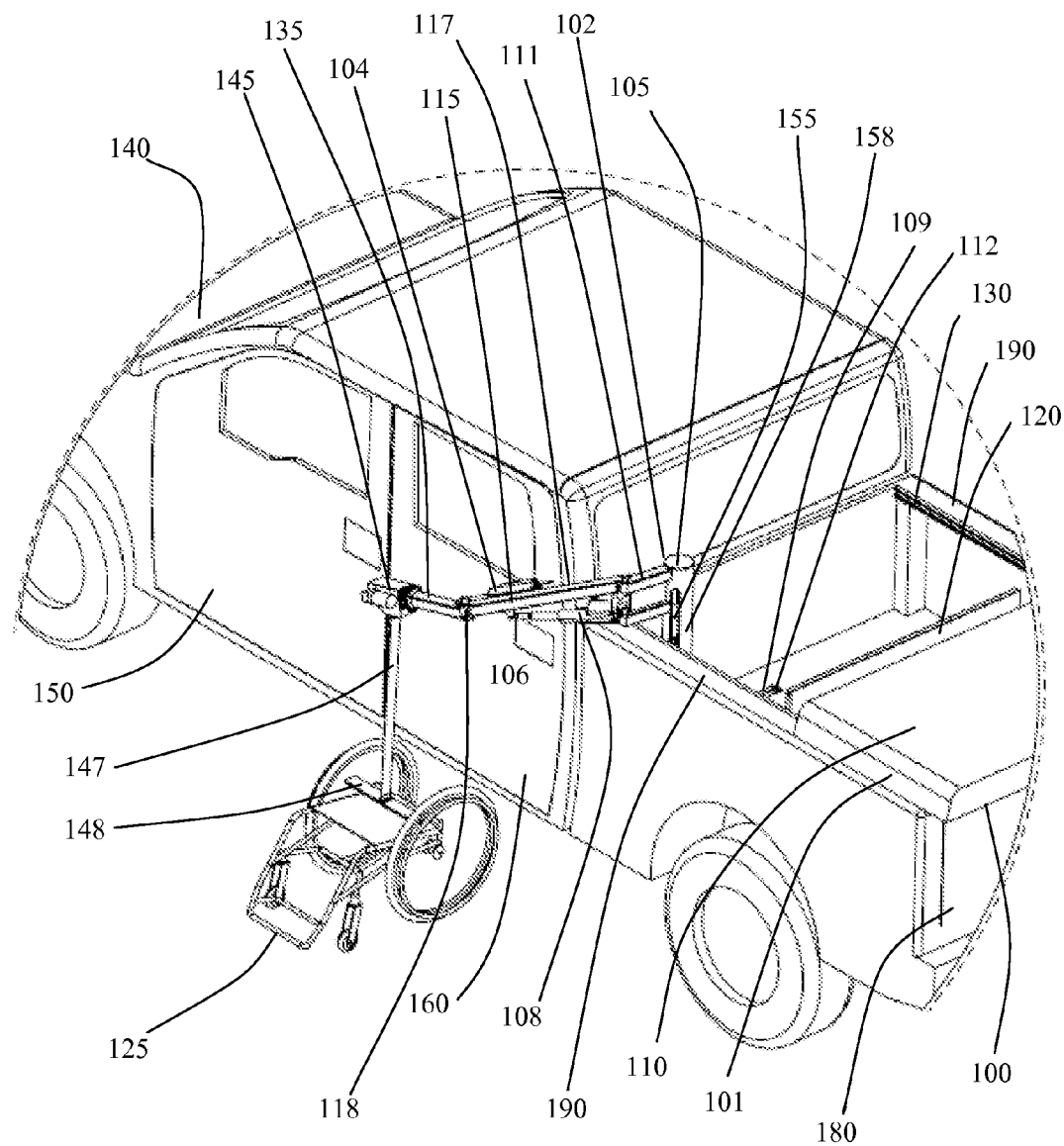
FIG. 17 is a perspective view of a close-up of the pick-up-truck-type vehicle with the apparatus of the present invention of FIG. 16.
Figure 18:
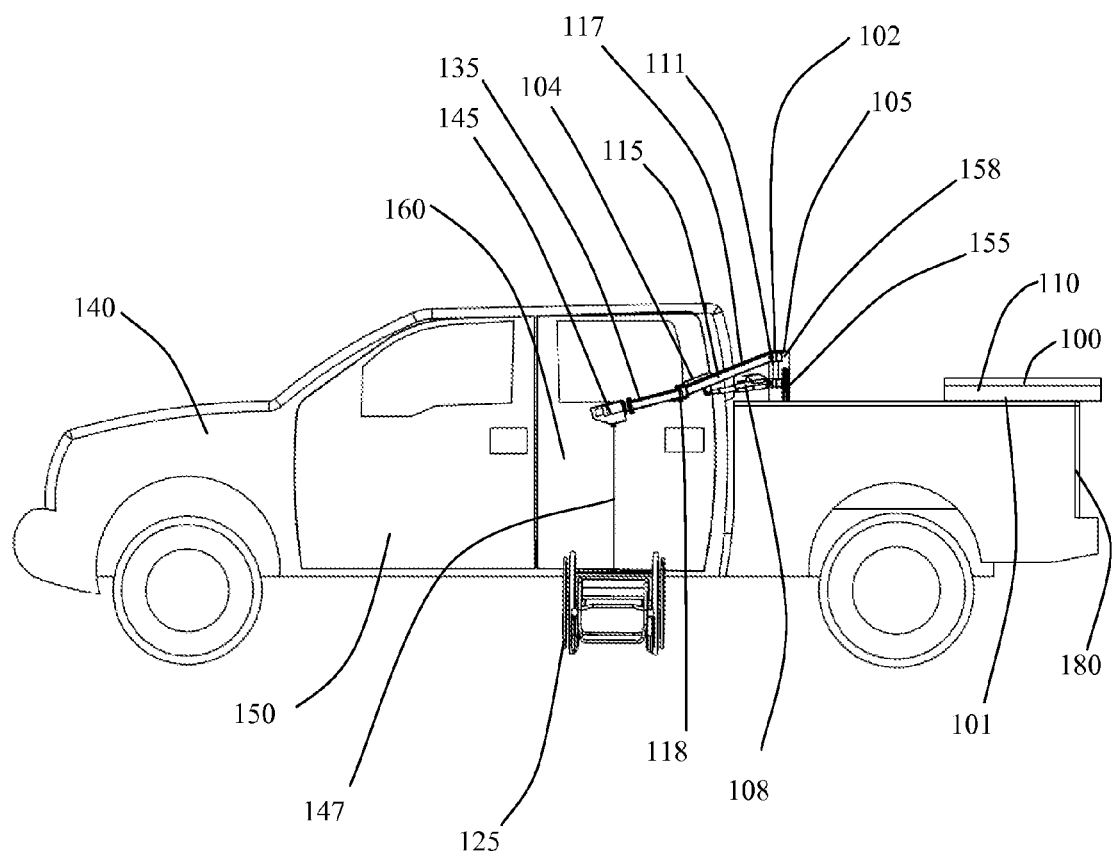
FIG. 18 is a side view of the pick-up-truck-type vehicle with the apparatus of the present invention of FIG. 16.
Figure 19:
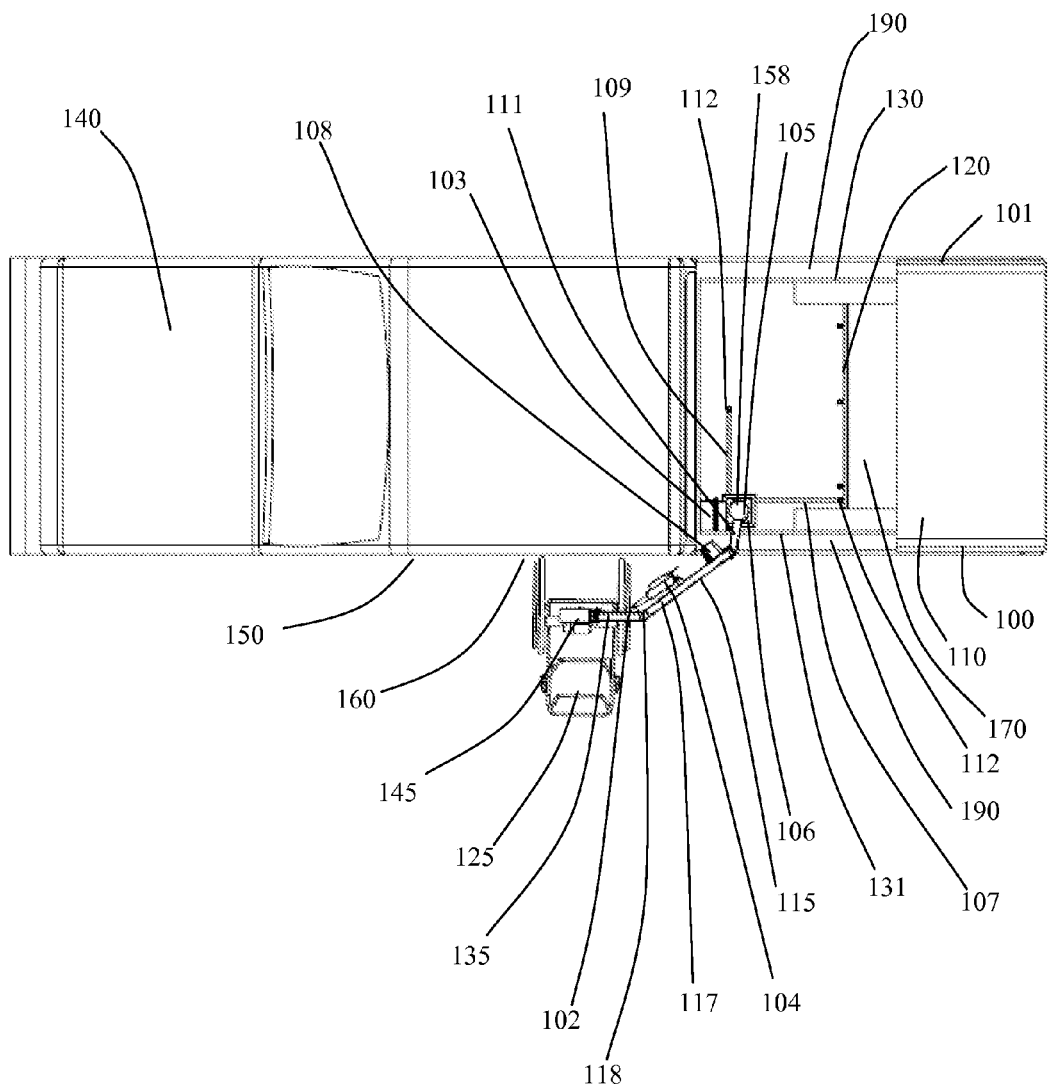
FIG. 19 is a top view of the pick-up-truck-type vehicle with the apparatus of the present invention of FIG. 16.
Figure 20:
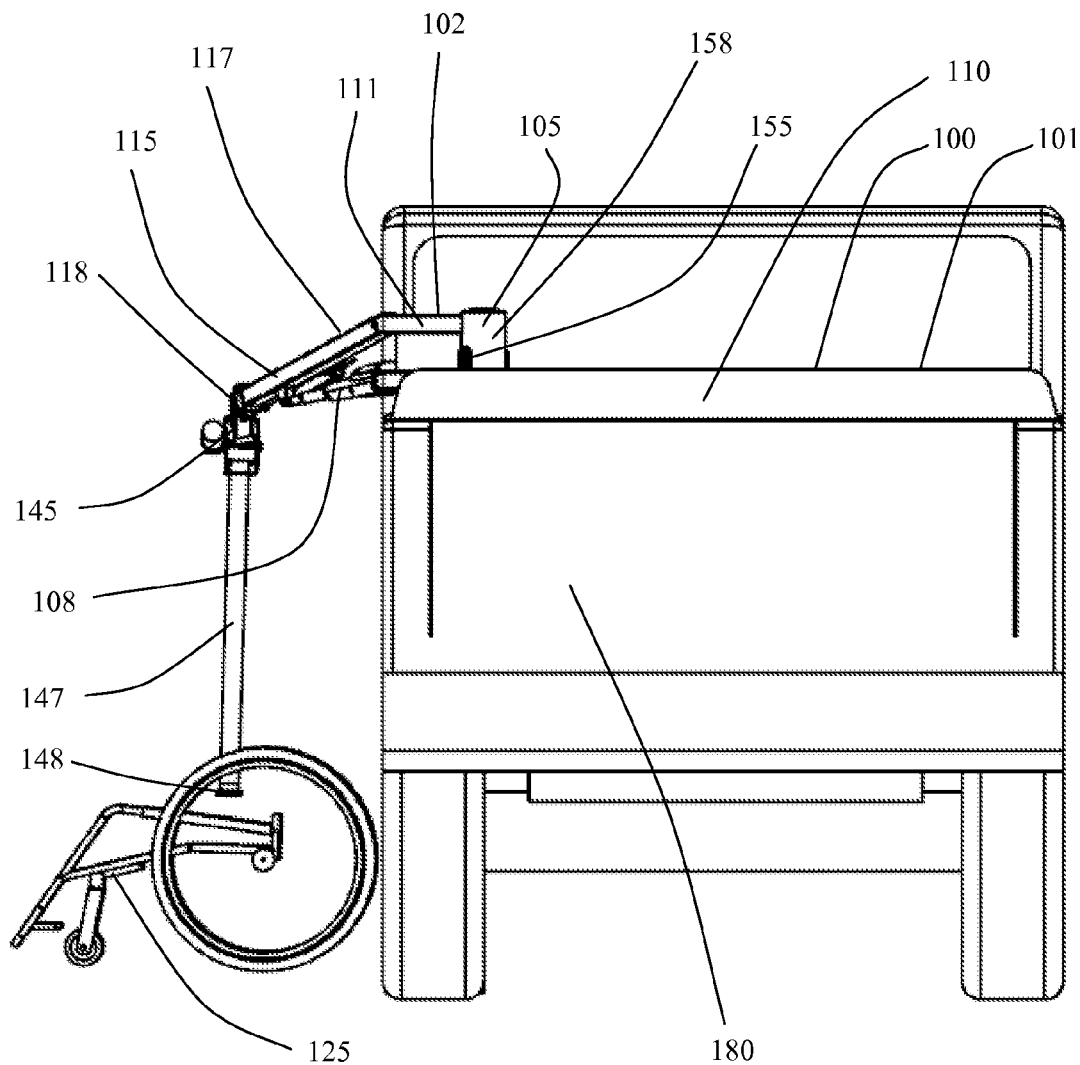
FIG. 20 is a rear view of the pick-up-truck-type vehicle with the apparatus of the present invention of FIG. 16.
Figure 25:
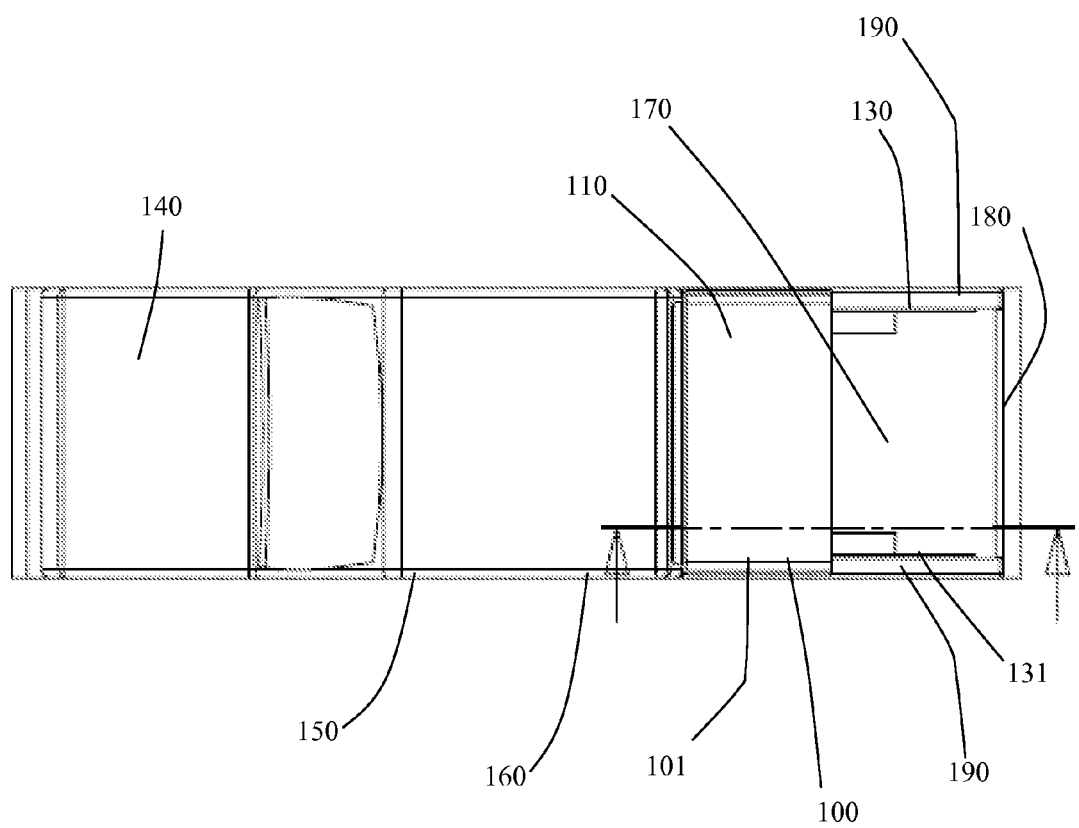
FIG. 25 is a top view of the pick-up-truck-type vehicle with the apparatus of the present invention of FIG. 1 in the stowed position with a section line for FIG. 26.
Figure 26:
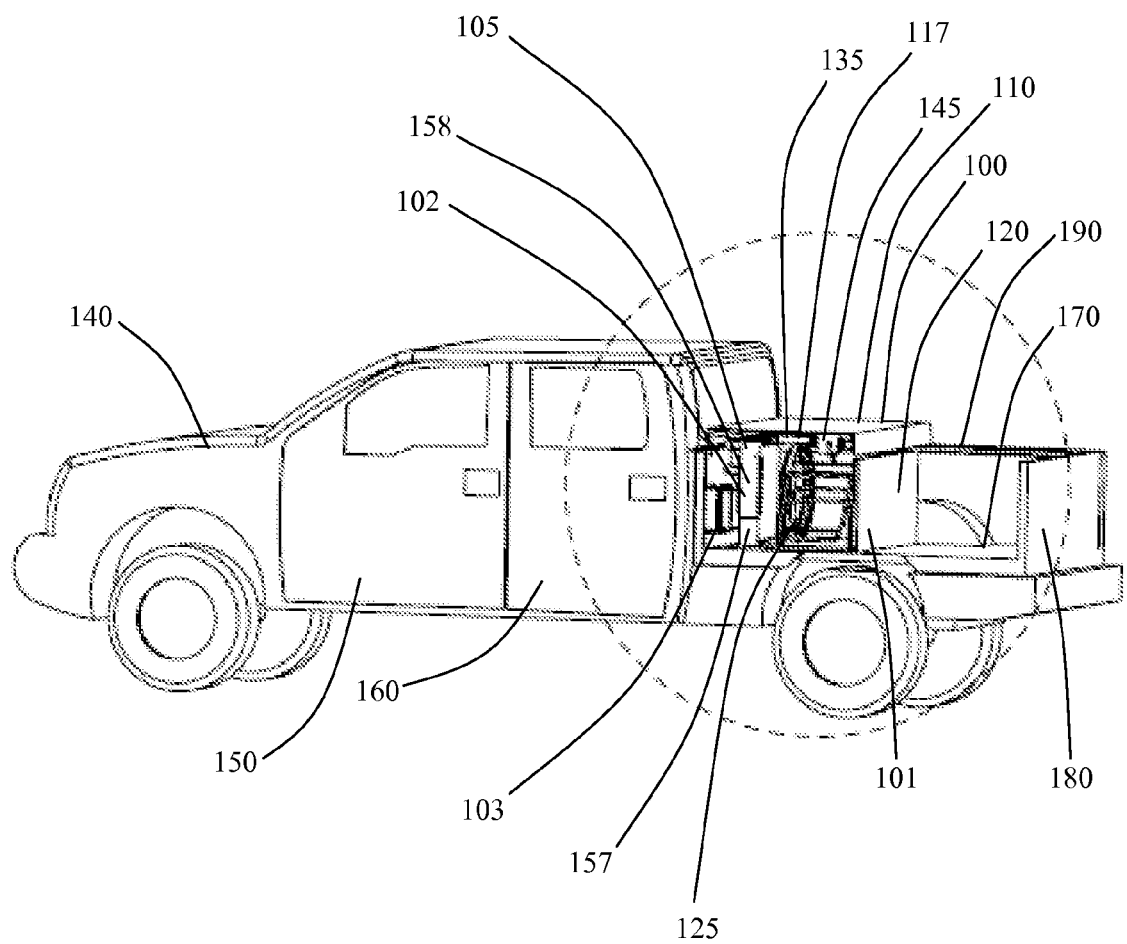
FIG. 26 is a perspective sectional view of the pick-up-truck-type vehicle with the apparatus of the present invention of FIG. 25 in the stowed position.
Figure 27:
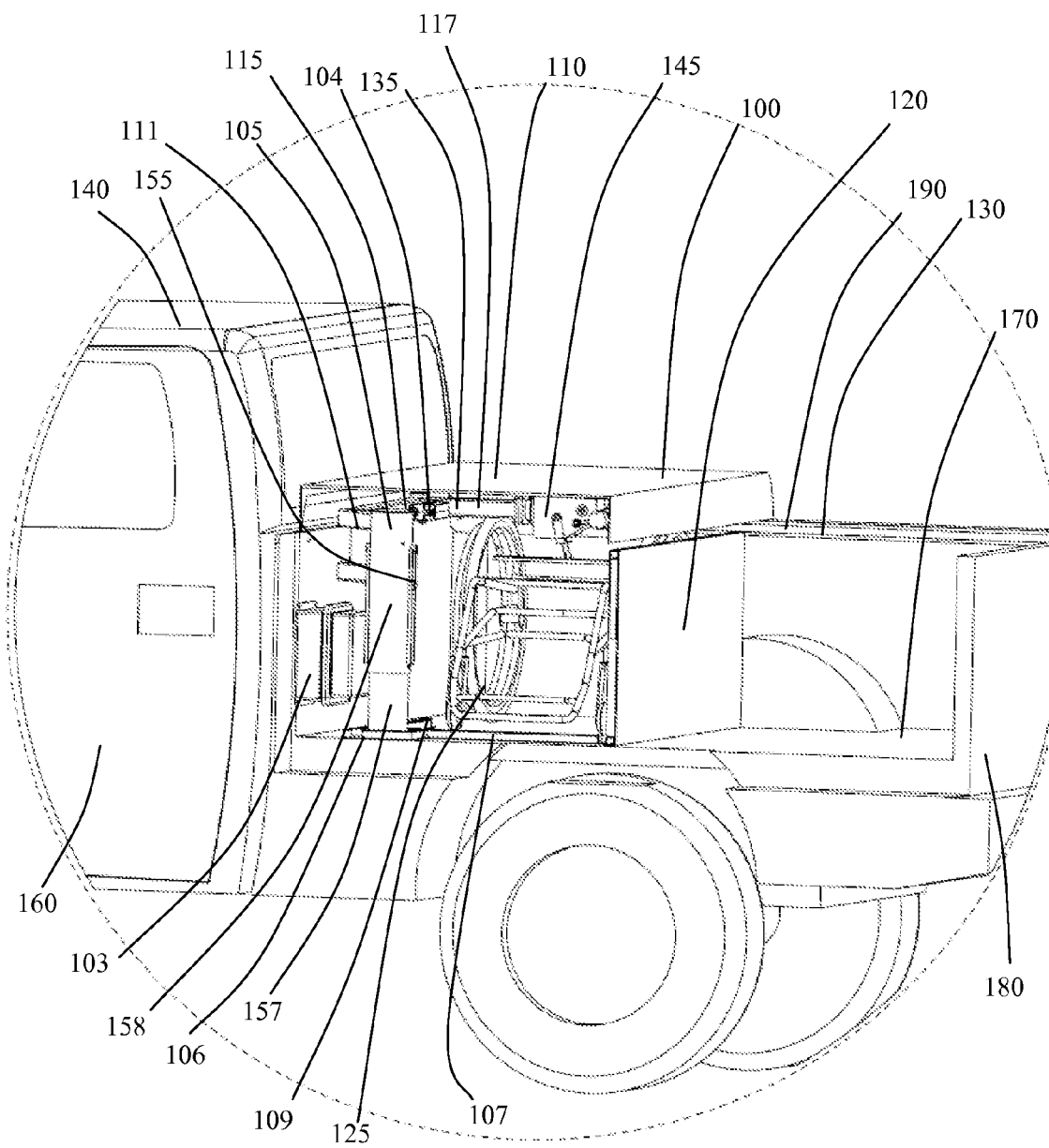
FIG. 27 is a perspective sectional view of a close-up of the pick-up-truck-type vehicle with the apparatus of the present invention of FIG. 25 in the stowed position.

Referring now to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 25, FIG. 26, and FIG. 27, a Wheelchair Transportation Loading and Storage Apparatus 100 mounted in a pick-up-truck-type vehicle 140 is illustrated. FIG. 1 shows a perspective view of a Wheelchair Transportation Loading and Storage Apparatus 100 mounted in a pick-up-truck-type vehicle 140 in the stowed position. FIG. 2 illustrates a perspective view of a Wheelchair Transportation Loading and Storage Apparatus 100 mounted in a pick-up-truck-type vehicle 140 in the first step of the process of unloading a wheelchair 125. FIG. 3 depicts a perspective view of a close-up of a Wheelchair Transportation Loading and Storage Apparatus 100 mounted in a pick-up-truck-type vehicle 140 at the same step of the process of unloading/unloading a wheelchair 125 as shown in FIG. 2. FIG. 4 demonstrates a top view of a Wheelchair Transportation Loading and Storage Apparatus 100 mounted in a pick-up-truck-type vehicle 140 at the same step of the process of unloading/unloading a wheelchair 125 as shown in FIG. 2 and FIG. 3. FIG. 5 illustrates a top view of a close-up of a Wheelchair Transportation Loading and Storage Apparatus 100 mounted in a pick-up-truck-type vehicle 140 at the same step of the process of unloading/unloading a wheelchair 125 as shown in FIG. 2, FIG. 3 and FIG. 4. FIG. 6 illustrates a perspective view of a Wheelchair Transportation Loading and Storage Apparatus 100 mounted in a pick-up-truck-type vehicle 140 in the process of unloading a wheelchair 125 in the step following the step represented in FIG. 2, FIG. 3, FIG. 4. and FIG. 5. FIG. 7 depicts a close-up of a perspective view of a Wheelchair Transportation Loading and Storage Apparatus 100 mounted in a pick-up-truck-type vehicle 140 in the same step of the process of unloading a wheelchair 125 as represented in FIG. 6. FIG. 8 depicts a side view of a Wheelchair Transportation Loading and Storage Apparatus 100 mounted in a pick-up-truck-type vehicle 140 in the same step of the process of unloading a wheelchair 125 as represented in FIG. 6 and FIG. 7. FIG. 9 illustrates a top view of a Wheelchair Transportation Loading and Storage Apparatus 100 mounted in a pick-up-truck-type vehicle 140 in the same step of the process of unloading a wheelchair 125 as represented in FIG. 6, FIG. 7 and FIG. 8. FIG. 10 shows a rear view of a Wheelchair Transportation Loading and Storage Apparatus 100 mounted in a pick-up-truck-type vehicle 140 in the same step of the process of unloading a wheelchair 125 as represented in FIG. 6, FIG. 7, FIG. 8 and FIG. 9. FIG. 11 depicts a rear perspective view of a Wheelchair Transportation Loading and Storage Apparatus 100 mounted in a pick-up-truck-type vehicle 140 in the process of unloading a wheelchair 125 in the step following the step represented in FIG. 6, FIG. 7, FIG. 8, FIG. 9 and FIG. 10. FIG. 12 illustrates a close-up of a rear perspective view of a Wheelchair Transportation Loading and Storage Apparatus 100 mounted in a pick-up-truck-type vehicle 140 in the same step of the process of unloading a wheelchair 125 as represented in FIG. 11. FIG. 13 illustrates a side view of a Wheelchair Transportation Loading and Storage Apparatus 100 mounted in a pick-up-truck-type vehicle 140 in the same step of the process of unloading a wheelchair 125 as represented in FIG. 11 and FIG. 12. FIG. 14 illustrates a rear view of a Wheelchair Transportation Loading and Storage Apparatus 100 mounted in a pick-up-truck-type vehicle 140 in the same step of the process of unloading a wheelchair 125 as represented in FIG. 11, FIG. 12 and FIG. 13. FIG. 15 depicts a top view of a Wheelchair Transportation Loading and Storage Apparatus 100 mounted in a pick-up-truck-type vehicle 140 in the same step of the process of unloading a wheelchair 125 as represented in FIG. 11, FIG. 12, FIG. 13 and FIG. 14. FIG. 16 depicts a perspective view of a Wheelchair Transportation Loading and Storage Apparatus 100 mounted in a pick-up-truck-type vehicle 140 in the process of unloading a wheelchair 125 in the step following the step represented in FIG. 11, FIG. 12, FIG. 13, FIG. 14 and FIG. 15. FIG. 17 illustrates a close-up of a perspective view of a Wheelchair Transportation Loading and Storage Apparatus 100 mounted in a pick-up-truck-type vehicle 140 in the same step of the process of unloading a wheelchair 125 as represented in FIG. 16. FIG. 18 illustrates a side view of a Wheelchair Transportation Loading and Storage Apparatus 100 mounted in a pick-up-truck-type vehicle 140 in the same step of the process of unloading a wheelchair 125 as represented in FIG. 16 and FIG. 17. FIG. 19 illustrates a side view of a Wheelchair Transportation Loading and Storage Apparatus 100 mounted in a pick-up-truck-type vehicle 140 in the same step of the process of unloading a wheelchair 125 as represented in FIG. 16, FIG. 17 and FIG. 18. FIG. 20 depicts a rear view of a Wheelchair Transportation Loading and Storage Apparatus 100 mounted in a pick-up-truck-type vehicle 140 in the same step of the process of unloading a wheelchair 125 as represented in FIG. 16, FIG. 17. FIG. 18 and FIG. 19. FIG. 25 shows a top view of a Wheelchair Transportation Loading and Storage Apparatus 100 mounted in a pick-up-truck-type vehicle 140 in the stowed position with a section line indicating the section view in FIG. 26 and FIG. 27. FIG. 26 shows a sectional perspective view of a Wheelchair Transportation Loading and Storage Apparatus 100 mounted in a pick-up-truck-type vehicle 140 which depicts the interior of a Wheelchair Transportation Loading and Storage Apparatus 100 in the stowed position at the section line indicated in FIG. 25. FIG. 27 shows a close-up of a sectional perspective view of a Wheelchair Transportation Loading and Storage Apparatus 100 mounted in a pick-up-truck-type vehicle 140 which depicts the interior of a Wheelchair Transportation Loading and Storage Apparatus 100 in the stowed position at the section line indicated in FIG. 25.

In further detail, referring now to the invention of FIG. 21, FIG. 22, FIG. 23, and FIG. 24, the wheelchair loading module 102 of the Wheelchair Transportation Loading and Storage Apparatus 100 is shown without the protective cover 101 and the control module 103 for clarification. The wheelchair loading module 102 comprises a base 106, a telescoping mast 105 and a wheel chair loading arm 117. The base comprises a right leg 109, a left leg 106 and a plurality of attachments holes 112, which bolt to the bed 170 of a pick-up-truck-type vehicle 140. The telescoping mast 105 comprises a lower mast 157, an upper mast 158 and a telescoping control module 155. The wheel chair loading arm 117 comprises a shoulder hinge 111, a middle arm 115, a middle arm actuating module 108, a forearm 135, a forearm actuating module 104, and a wench module 145. The upper mast 158 may be horizontally rotated around the lower mast 157. The shoulder hinge 111 extends from the upper mast 158. The middle arm 115 extends from the shoulder hinge 111. The middle arm actuating module 108 is connected between the shoulder hinge 111 and the middle arm 115 and allows the middle arm 115 to pivot vertically from the shoulder hinge 111. The forearm 135 is attached to the middle arm by a horizontal hinge 118. The forearm actuating module 104 is connected between the middle arm 115 and the forearm 135 and allows the forearm 135 to pivot horizontally relative to the middle arm 115. The wench module 145 extends from the end of the forearm 135 and allows the lifting strap 147 to be extended and retracted. The wheelchair connector 148 extends from the end of the lifting strap 147 and attaches to a wheelchair 125.

In further detail, still referring to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and FIG. 27, the Wheelchair Transportation Loading and Storage Apparatus 100 comprises a protective cover 101, a wheelchair loading module 102 and a control module 103. The protective cover 101 comprises a body 120, a lid 110, a right rail 130 and a left rail 131. The wheelchair loading module 102 comprises a base 106, a telescoping mast 105 and a wheel chair loading arm 117. The base comprises a right leg 109, a left leg 106 and a plurality of attachments holes 112, which bolt to the bed 170 of a pick-up-truck-type vehicle 140 and attach the Wheelchair Transportation Loading and Storage Apparatus 100 to the pick-up-truck-type vehicle 140. The telescoping mast 105 comprises a lower mast 157, an upper mast 158 and a telescoping control module 155. The wheel chair loading arm 117 comprises a shoulder hinge 111, a middle arm 115, a middle arm actuating module 108, a forearm 135, a forearm actuating module 104, and a wench module 145. The upper mast 158 may be horizontally rotated around the lower mast 157. The shoulder hinge 111 extends from the upper mast 158. The middle arm 115 extends from the shoulder hinge 111. The middle arm actuating module 108 is connected between the shoulder hinge 111 and the middle arm 115 and allows the middle arm 115 to pivot vertically from the shoulder hinge 111. The forearm 135 is attached to the middle arm by a horizontal hinge 118. The forearm actuating module 104 is connected between the middle arm 115 and the forearm 135 and allows the forearm 135 to pivot horizontally relative to the middle arm 115. The wench module 145 extends from the end of the forearm 135 and allows the lifting strap 147 to be extended and retracted. The wheelchair connector 148 extends from the end of the lifting strap 147 and attaches to a wheelchair 125. The control module 103 comprises the electronics which control the Wheelchair Transportation Loading and Storage Apparatus 100 and relays signals which control the lid 110 of the protective cover 101 and control the wheelchair loading module 102. The control module 103 may be controlled remotely by a user of the Wheelchair Transportation Loading and Storage Apparatus 100.

Figure 21:
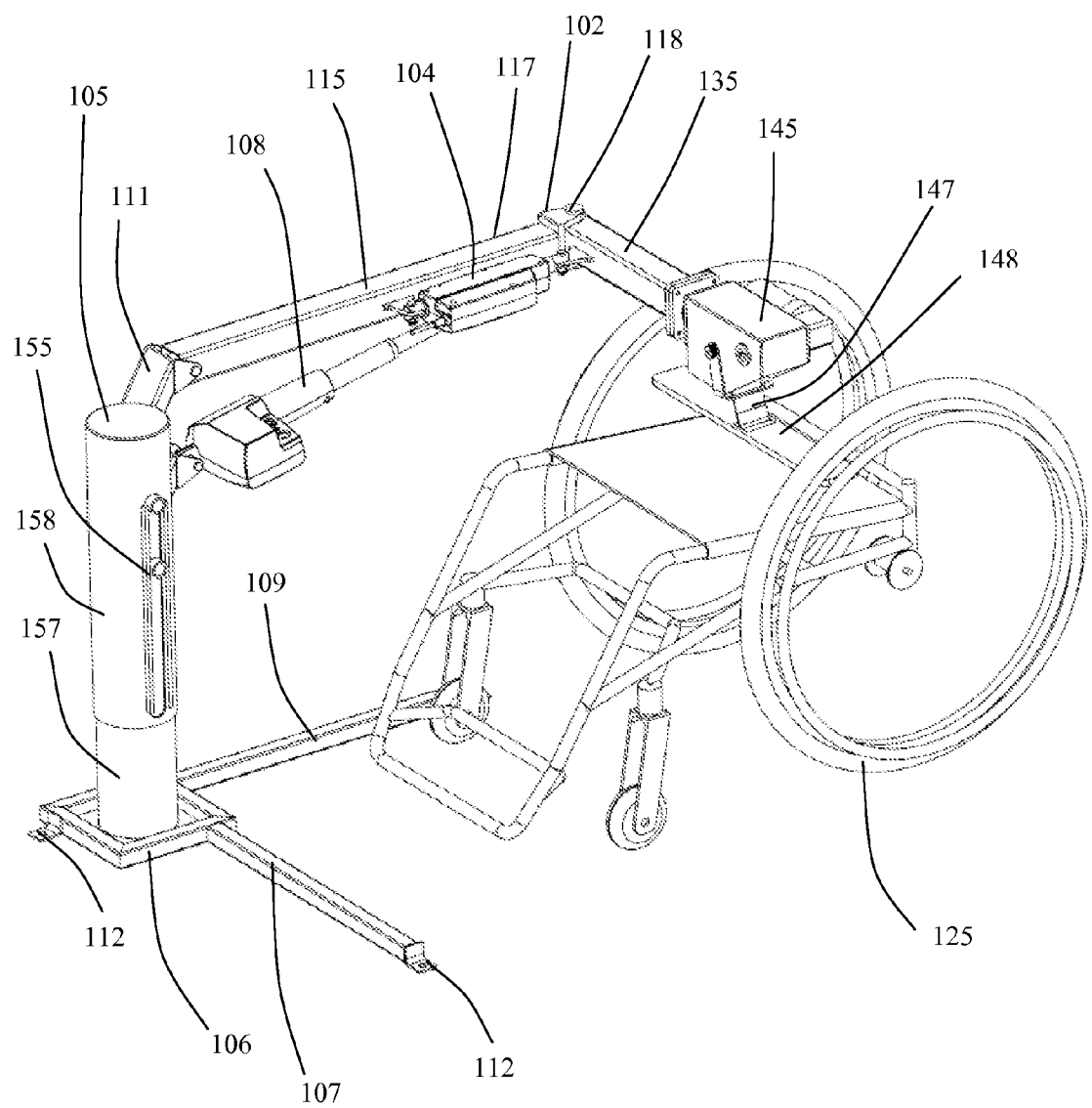
FIG. 21 is a perspective view of the loading module of the apparatus of the present invention of FIG. 1 in the stowed position.

In further detail, referring to the invention of FIG. 1, FIG. 25, FIG. 26 and FIG. 27, a Wheelchair Transportation Loading and Storage Apparatus 100 is mounted in the bed 170 of a pick-up-truck-type vehicle 140 and is shown in the stowed position. FIG. 21 shows a detail of the position of the wheelchair loading module 102 when the Wheelchair Transportation Loading and Storage Apparatus 100 is in the stowed position. In the stowed position, the wheelchair 125, the wheelchair loading module 102 and the control module 103 are enclosed within the protective cover 101 and the lid 110 is in a closed position. In the stowed position, the wheelchair loading module 102 is fully refracted in order to be enclosed within the protective cover 101, with the upper mast 158 telescopically refracted onto the lower mast 157, the middle arm actuating module 108 fully refracted, the forearm actuating module 104 is fully refracted and the lifting strap 147 is refracted into the wench module 145. In the stowed position, the Wheelchair Transportation Loading and Storage Apparatus 100 protects the wheelchair and the Wheelchair Transportation Loading and Storage Apparatus' mechanisms from weather and exposure to the elements during storage and transport of the wheelchair 125. In the stowed position, the Wheelchair Transportation Loading and Storage Apparatus 100 is mounted in a portion of a pick-up-truck-type vehicle bed 170 in such a way as to allow for substantial use of the pick-up-truck-type vehicle bed 170 for other purposes, such as the transportation and storage of tools and materials, and allows for unrestricted access to the rear gate 180 of the pick-up-truck-type vehicle 140. In the stowed position, the Wheelchair Transportation Loading and Storage Apparatus 100 substantially appears as a standard in-bed toolbox for a pick-up-truck-type vehicle and conceals the fact that a wheelchair is contained within the protective cover 101, preventing exposure of the wheelchair to theft and concealing the fact that user utilizes a wheelchair 125.

In further detail, referring to the invention of FIG. 2, FIG. 3, FIG. 4 and FIG. 5, a Wheelchair Transportation Loading and Storage Apparatus 100 is mounted in the bed 170 of a pick-up-truck-type vehicle 140 and shown in the first step of the process of unloading a wheelchair 125. FIG. 21 shows a detail of the position of the wheelchair loading module 102 when the Wheelchair Transportation Loading and Storage Apparatus 100 is in the first step of the process of unloading a wheelchair 125. In the first step of the process of unloading a wheelchair 125, the user sends a remote signal to the control module 103 which causes the lid 110 to be retracted along the right rail 130 and the left rail 131 thereby opening the protected cover 101 of the Wheelchair Transportation Loading and Storage Apparatus 100.

Figure 22:
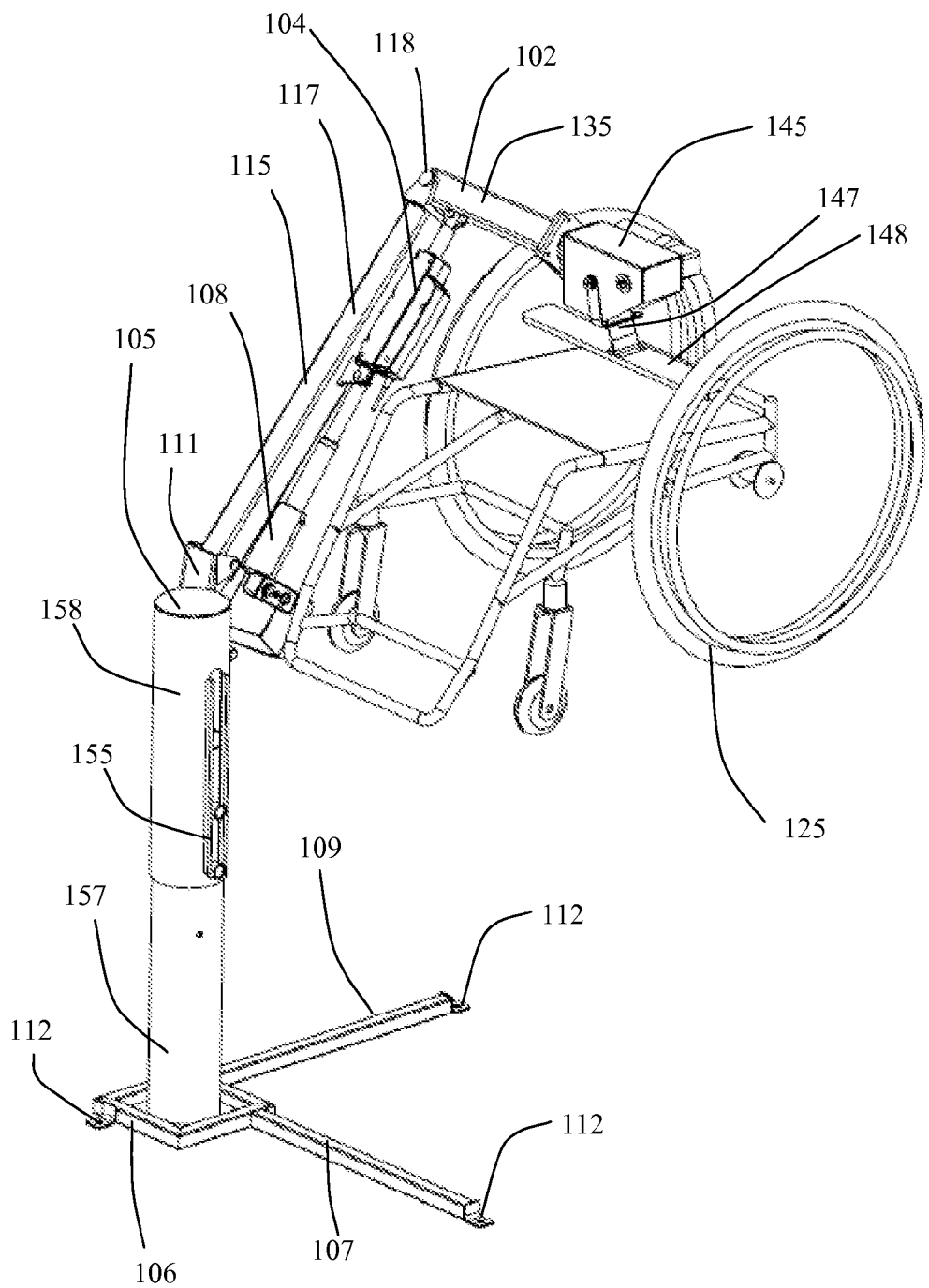
FIG. 22 is a perspective view of the loading module of the apparatus of the present invention of FIG. 21 in the process of loading/unloading a wheelchair.

In further detail, referring to the invention of FIG. 6, FIG. 7, FIG. 8, FIG. 9 and FIG. 10, a Wheelchair Transportation Loading and Storage Apparatus 100 is mounted in the bed 170 of a pick-up-truck-type vehicle 140 and shown in the second step of the process of unloading a wheelchair 125. FIG. 22 shows a detail of the position of the wheelchair loading module 102 when the Wheelchair Transportation Loading and Storage Apparatus 100 is in the second step of the process of unloading a wheelchair 125. In the second step of the process of unloading a wheelchair 125, the telescoping control module 155 telescopically extends the upper mast 158 from the lower mast 157, and the middle arm actuating module 108 pivots the middle arm 115 vertically from the shoulder hinge and fully extends the middle arm 115 to its maximum vertical position. In the second step of the process of unloading a wheelchair 125, the wheelchair 125 is suspended above the sidewall 190 of the bed 170 of the pick-up-truck-type vehicle 140.

Figure 23:
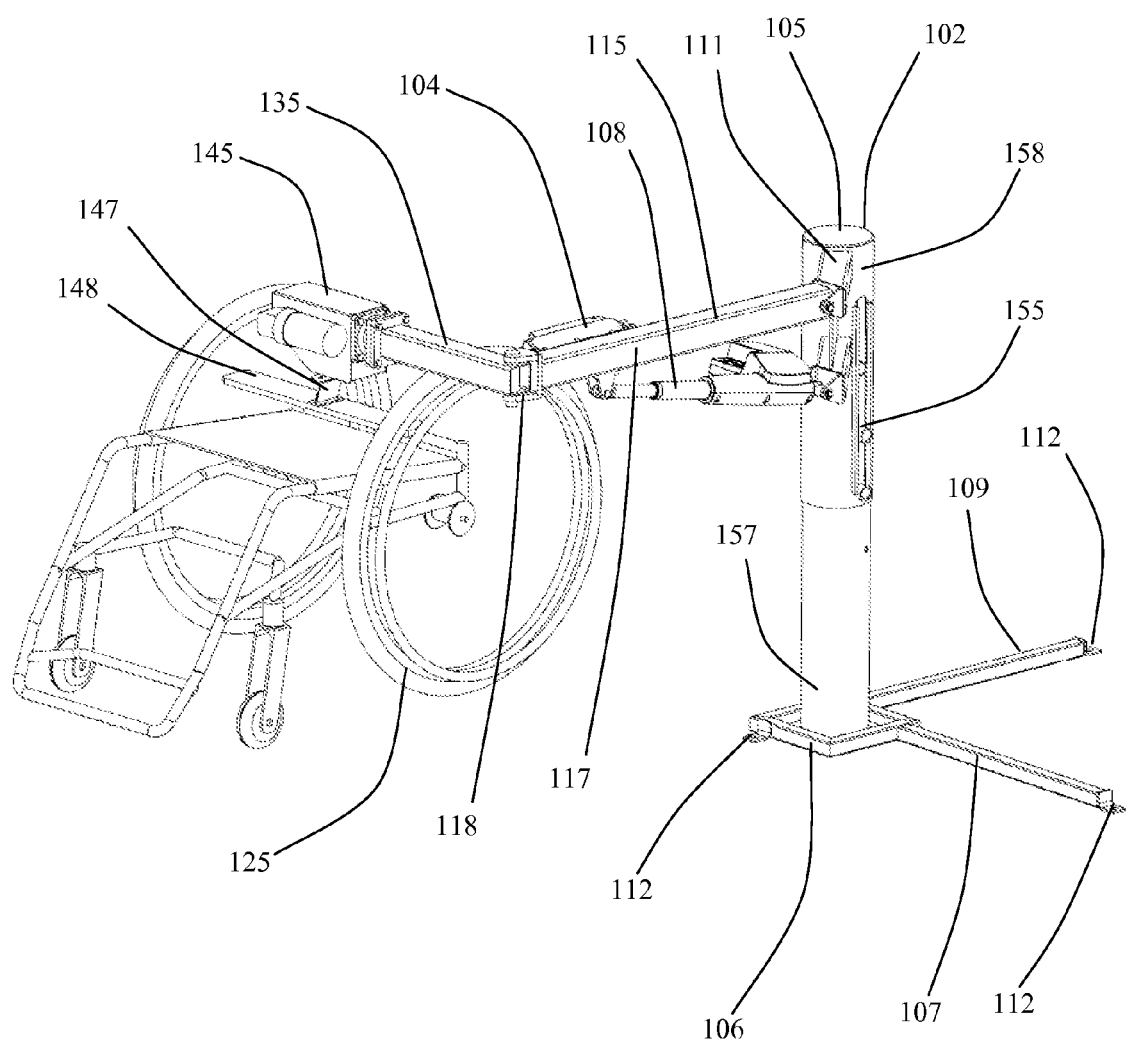
FIG. 23 is a perspective view of the loading module of the apparatus of the present invention of FIG. 21 in the process of loading/unloading a wheelchair.

In further detail, referring to the invention of FIG. 11, FIG. 12, FIG. 13, FIG. 14 and FIG. 15, a Wheelchair Transportation Loading and Storage Apparatus 100 is mounted in the bed 170 of a pick-up-truck-type vehicle 140 and shown in the third step of the process of unloading a wheelchair 125. FIG. 23 shows a detail of the position of the wheelchair loading module 102 when the Wheelchair Transportation Loading and Storage Apparatus 100 is in the third step of the process of unloading a wheelchair 125. In the third step of the process of unloading a wheelchair 125, the upper mast 158 is rotated clockwise around the lower mast 157 so that the suspended wheelchair 125 is moved from the position in the second step of the process of unloading a wheelchair 125, which is illustrated in FIG. 6, FIG. 7, FIG. 8, FIG. 9, FIG. 10 and FIG. 22, over the sidewall 190 of the bed 170 of the pick-up-truck-type vehicle 140. The middle arm actuating module 108 then pivots the middle arm 115 vertically from the shoulder hinge and retracts the middle arm 115 to a horizontal position ending in the position illustrated in FIG. 11, FIG. 12, FIG. 13, FIG. 14, FIG. 15 and FIG. 23.

Figure 24:
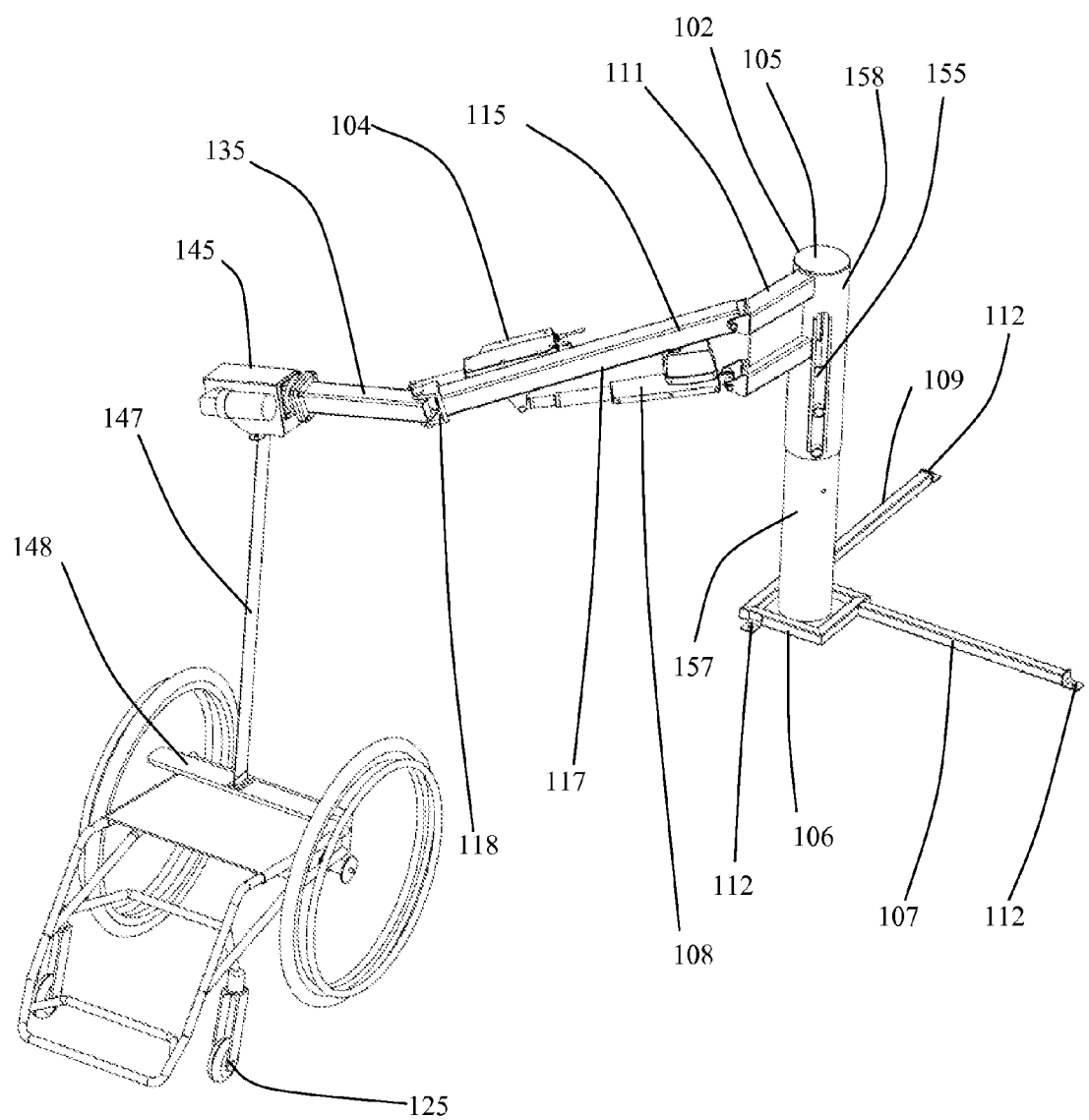
FIG. 24 is a perspective view of the loading module of the apparatus of the present invention of FIG. 21 in the process of loading/unloading a wheelchair.

In further detail, referring to the invention of FIG. 16, FIG. 17, FIG. 18, FIG. 19 and FIG. 20, a Wheelchair Transportation Loading and Storage Apparatus 100 is mounted in the bed 170 of a pick-up-truck-type vehicle 140 and shown in the last step of the process of unloading a wheelchair 125. FIG. 24 shows a detail of the position of the wheelchair loading module 102 when the Wheelchair Transportation Loading and Storage Apparatus 100 is in the third step of the process of unloading a wheelchair 125. In the last step of the process of unloading a wheelchair 125, the upper mast 158 is rotated clockwise around the lower mast 157 while the forearm actuating module 104 extends the forearm 135 by pivoting the forearm 135 horizontally relative to the middle arm 115 around the horizontal hinge 118 so that the suspended wheelchair 125 is moved from the position in the third step of the process of unloading a wheelchair 125, which is illustrated in FIG. 11, FIG. 12, FIG. 13, FIG. 14, FIG. 15 and FIG. 23, to a position before the driver's-side rear door 160 of the pick-up-truck-type vehicle 140 and within substantial proximity of the driver's-side front door 150 of the pick-up-truck-type vehicle 140. The strap 147 is then extended from the wench module 145 and lowers the wheelchair 125 to the ground before the driver's-side rear door 160 of the pick-up-truck-type vehicle 140 and within substantial proximity of the driver's-side front door 150 of the pick-up-truck-type vehicle 140, so that the user, including the driver of the pick-up-truck-type vehicle 140, may access the wheelchair 125 from the passenger compartment or driver's seat of the pick-up-truck-type vehicle 140 and disconnect the wheelchair 125 from the wheelchair connector 148. To load the wheelchair 125 into the Wheelchair Transportation Loading and Storage Apparatus 100, the steps of the process of unloading a wheelchair 125 are performed in reverse order.

The construction details of the invention as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and FIG. 27, are that the Wheelchair Transportation Loading and Storage Apparatus 100 comprises a protective cover 101, a wheelchair loading module 102 and a control module 103. The protective cover 101 comprises a body 120, a lid 110, a right rail 130 and a left rail 131. The body 120 is comprised of one or more weather resistant materials, such as metal, plastic, powder-coated metal, composite materials or the like, or a combination thereof. The lid 110 is comprised of one or more weather resistant materials, such as metal, plastic, powder-coated metal, composite materials or the like, or a combination thereof. The right rail 130 and the left rail 131 are comprised of screws, actuated screws, pistons, motion-facilitating structures, or motors, or a combination thereof, which are further comprised of one or more materials, such as metal, plastic or the like, or a combination thereof. The wheelchair loading module 102 comprises a base 106, a telescoping mast 105 and a wheel chair loading arm 117. The base comprises a right leg 109, a left leg 106 and a plurality of attachments holes 112, which bolt to the bed 170 of a pick-up-truck-type vehicle 140 and attach the Wheelchair Transportation Loading and Storage Apparatus 100 to the pick-up-truck-type vehicle 140. The base 106 is comprised of one or more materials, such as metal, plastic, powder-coated metal, composite materials or the like, or a combination thereof. The telescoping mast 105 comprises a lower mast 157, an upper mast 158 and a telescoping control module 155. The upper mast 158 and the lower mast 157 are comprised of screws, actuated screws, pistons, motion-facilitating structures, or motors, or a combination thereof, which are comprised of one or more materials, such as metal, plastic, powder-coated metal, composite materials or the like, or a combination thereof. The upper mast 158 may be horizontally rotated around the lower mast 157. The telescoping control module 155 is comprised of screws, actuated screws, pistons, motion-facilitating structures, or motors, or a combination thereof, which are comprised of one or more materials, such as metal, plastic, powder-coated metal, composite materials or the like, or a combination thereof. The wheel chair loading arm 117 comprises a shoulder hinge 111, a middle arm 115, a middle arm actuating module 108, a forearm 135, a forearm actuating module 104, and a wench module 145. The shoulder hinge 111 extends from the upper mast 158 and is comprised of one or more materials, such as metal, plastic, powder-coated metal, composite materials or the like, or a combination thereof. The middle arm 115 extends from the shoulder hinge 111 and is comprised of one or more materials, such as metal, plastic, powder-coated metal, composite materials or the like, or a combination thereof. The middle arm actuating module 108 is connected between the shoulder hinge 111 and the middle arm 115, allows the middle arm 115 to pivot vertically from the shoulder hinge 111 and is comprised of screws, actuated screws, pistons, motion-facilitating structures, or motors, or a combination thereof, which are comprised of one or more materials, such as metal, plastic, powder-coated metal, composite materials or the like, or a combination thereof. The forearm 135 is attached to the middle arm by a horizontal hinge 118 and is comprised of one or more materials, such as metal, plastic, powder-coated metal, composite materials or the like, or a combination thereof. The forearm actuating module 104 is connected between the middle arm 115 and the forearm 135, allows the forearm 135 to pivot horizontally relative to the middle arm 115 and is comprised of screws, actuated screws, pistons, motion-facilitating structures, or motors, or a combination thereof, which are comprised of one or more materials, such as metal, plastic, powder-coated metal, composite materials or the like, or a combination thereof. The wench module 145 extends from the end of the forearm 135, allows the lifting strap 147 to be extended and retracted and is comprised of screws, actuated screws, pistons, motion-facilitating structures, or motors, or a combination thereof, which are comprised of one or more materials, such as metal, plastic, powder-coated metal, composite materials or the like, or a combination thereof. The lifting strap is comprised of cloth, plastic, metal, fibrous material, or the like, or a combination thereof. The wheelchair connector 148 extends from the end of the lifting strap 147, attaches to a wheelchair 125 and is comprised of one or more materials, such as metal, plastic, powder-coated metal, composite materials or the like, or a combination thereof. The control module 103 comprises the electronics which control the Wheelchair Transportation Loading and Storage Apparatus 100 and relays signals which control the lid 110 of the protective cover 101 and control the wheelchair loading module 102. The control module 103 may be controlled remotely by a user of the Wheelchair Transportation Loading and Storage Apparatus 100.

The advantages of the present invention include, without limitation, that it provides a means for loading a wheelchair into a protective cover mounted in the bed of a pick-up-type vehicle and prevents exposing the wheelchair and the mechanisms and electronics of the Wheelchair Transportation Loading and Storage Apparatus to weather and the elements while the wheelchair is within the protective cover during transportation. The Wheelchair Transportation Loading and Storage Apparatus is capable of lifting a wheelchair from a position substantially near the passenger compartment of a pick-up-truck type vehicle into an enclosure mounted in the pick-up-truck-type vehicle's bed, allowing the driver of the pick-up-truck-type vehicle to utilize the Wheelchair Transportation Loading and Storage Apparatus. The enclosure comprises a weather-resistant shell and a weather-resistant cover that may be remotely opened and closed, which does not substantially inhibit the use of the pickup truck bed and which does not require extensive modification of the transporting pick-up-truck-type vehicle. The Wheelchair Transportation Loading and Storage Apparatus allows a wheelchair to be transported in poor weather conditions without exposing delicate parts of the wheelchair to elements, which can cause corrosion and damage, during transportation. Furthermore, the Wheelchair Transportation Loading and Storage Apparatus enables a wheelchair user, including the driver of the pick-up-truck-type vehicle, to transition himself or herself to the passenger compartment or driver's seat of a pick-up-truck-type vehicle and independently load and stow the wheelchair into a weather-resistant enclosure without the assistance of others. The enclosure is small enough to permit the pick-up-truck-type vehicle bed to be substantially used for its intended purpose, such as storing and transporting tools and/or materials. Additionally, when closed, the Wheelchair Transportation Loading and Storage Apparatus has the appearance of a standard pick-up truck bed toolbox, concealing the wheelchair loading and storage capability of the vehicle.

In broad embodiment, the present invention is an improvement of an apparatus for loading a wheelchair into a vehicle which automatically stores the wheelchair within an enclosure that protects the wheelchair and the mechanisms of the apparatus from exposure to weather during transportation. The Wheelchair Transportation Loading and Storage Apparatus automatically loads into and stores a wheelchair within a secure enclosure which protects the wheelchair and the loading apparatus' mechanisms from weather and exposure to the elements and which is mounted in a portion of a pickup truck bed to allow for substantial use of the pickup bed for other purposes, such as the transportation and storage of tools and materials.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. An apparatus; which allows an unassisted disabled driver, who is unable to walk and requires a wheelchair for mobility, to independently load said wheelchair into an unenclosed bed of a pickup truck and to independently unload said wheelchair from said unenclosed bed of said pickup truck; and which protects said wheelchair from exposure to weather during transportation and storage in said pickup truck; said apparatus comprising: an openable and closable weather-resistant protective cover mountable in said unenclosed bed of said pickup truck, which substantially appears as an ordinary in-bed toolbox for a pickup truck and which allows for substantial use of said unenclosed bed of said pickup truck, said weather-resistant protective cover comprising a body and a lid; a wheelchair loading module enclosable within said weather-resistant protective cover, said wheelchair loading module comprising a rotatable telescopic mast, a primary arm, a secondary arm extending from said primary arm, winch assembly extending from the end of said secondary arm, and a wheelchair connector on the end of said winch assembly; and a remotely controllable control module enclosable within said weather-resistant protective cover, which is controllable from the proximity of said unassisted disabled driver's seat in the passenger compartment of said pickup truck and which is configured to control and coordinate an extension sequence; said extension sequence comprising horizontally sliding said lid of said weather resistant protective cover open over said unenclosed bed of said pickup truck, vertically extending said rotatable telescopic mast of said wheelchair loading module to a position above said weather-resistant protective cover, swinging said primary arm of said wheelchair loading module upward at an acute angle until said wheelchair connector is raised to a sufficient height above said weather-resistant protective cover to allow said wheelchair connected to said wheelchair connector to clear said sidewall of said unenclosed bed of said pickup truck, extending said secondary arm from being horizontally perpendicular to said primary arm to extending straight out from said primary arm, rotating said rotatable telescopic mast at a reflex angle over the sidewall of said unenclosed bed of said pickup truck until said wheelchair connector is near said passenger compartment of said pickup truck, and lowering said winch assembly so that said wheelchair connector is in said proximity of said driver's seat of said pick truck; and a retraction sequence; said retraction sequence comprising raising said winch assembly to lift said wheelchair connector from said proximity of said driver's seat of said pickup truck, rotating said rotatable telescopic mast back at said reflex angle over said sidewall of said unenclosed bed of said pickup truck, horizontally folding said second arm to be perpendicular to said primary arm to position said wheelchair connector above said weather-resistant protective cover, swinging said primary arm downward at said acute angle lowering said wheelchair connector into said weather-resistant protective cover, lowering said rotatable telescopic mast into said weather-resistant protective cover, and horizontally sliding said lid until closed; said unassisted disabled driver in said wheelchair positioned near said driver's seat of said pickup loads said wheelchair by remotely activating said extension sequence, moving from said wheelchair to said driver's seat, connecting said wheelchair to said wheelchair connector, and remotely activating said retraction sequence; said wheelchair, said wheelchair loading module and said control module being enclosed within said weather-resistant protective cover during transportation and storage; thereby protecting said wheelchair, said wheelchair loading module and said control module from exposure to weather during transportation and storage by said pickup truck and thereby concealing said wheelchair, said wheelchair loading module and said control module during transportation and storage by said pickup truck in said weather-resistant protective cover, which substantially appears as said ordinary in-bed toolbox for said pickup truck; and said unassisted disabled driver in said driver's seat of said pickup unloads said wheelchair by remotely activating said extension sequence, disconnecting said wheelchair from said wheelchair connector, moving from said driver's seat to said wheelchair, and remotely activating said retraction sequence; at which point said weather-resistant protective cover substantially appears as said ordinary in-bed toolbox for said pickup truck.

* * * * *